US012187364B2

(12) United States Patent
Roy et al.

(10) Patent No.: US 12,187,364 B2
(45) Date of Patent: Jan. 7, 2025

(54) TRACK ASSEMBLY HAVING A ROTATION LIMITING DEVICE AND VEHICLE HAVING SAME

(71) Applicant: BOMBARDIER RECREATIONAL PRODUCTS INC., Valcourt (CA)

(72) Inventors: Charles Roy, Orford (CA); Kevin Poirier, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 510 days.

(21) Appl. No.: 17/592,954

(22) Filed: Feb. 4, 2022

(65) Prior Publication Data

US 2023/0249763 A1   Aug. 10, 2023

(51) Int. Cl.
*B62D 55/04* (2006.01)
*B62D 55/108* (2006.01)
*B62D 55/116* (2006.01)

(52) U.S. Cl.
CPC ......... *B62D 55/04* (2013.01); *B62D 55/1086* (2013.01); *B62D 55/116* (2013.01)

(58) Field of Classification Search
CPC .. B62D 55/04; B62D 55/1086; B62D 55/116; B62D 55/104; B62D 55/108
See application file for complete search history.

(56) References Cited

U.S. PATENT DOCUMENTS

| | | | | |
|---|---|---|---|---|
| 4,702,843 A * | 10/1987 | Oswald | ................. | B62D 49/08 |
| | | | | 280/5.509 |
| 8,794,358 B2 * | 8/2014 | Hansen | ................. | B62D 55/10 |
| | | | | 180/9.26 |
| 9,211,921 B2 * | 12/2015 | Zuchoski | ............. | B62D 55/088 |
| 9,505,451 B2 * | 11/2016 | Zuchoski | ............. | B62D 55/04 |
| 9,656,703 B2 * | 5/2017 | Zuchoski | ............ | B60W 50/082 |
| 11,992,781 B2 * | 5/2024 | Wood | ................... | B62D 55/065 |
| 2018/0265146 A1 * | 9/2018 | Laplante | ............... | B62D 55/04 |

FOREIGN PATENT DOCUMENTS

| | | |
|---|---|---|
| CA | 2756859 A1 | 5/2012 |
| WO | 2019014757 A1 | 1/2019 |

* cited by examiner

*Primary Examiner* — Tony H Winner
*Assistant Examiner* — Michael R Stabley
(74) *Attorney, Agent, or Firm* — BCF LLP

(57) ABSTRACT

A track assembly for a vehicle includes: a frame; a plurality of track-contacting wheels; an endless track disposed around the track-contacting wheels; a rotation limiting device for limiting rotation of the track assembly relative to a vehicle frame; a connection bracket for connecting the rotation limiting device to the frame; and a bushing assembly slidably connecting a device connecting end of the connection bracket to an elongate support of the rotation limiting device. The bushing assembly includes an inner bushing slidably mounted to the elongate support, an outer bushing affixed to the device connecting end, and a resilient element connected between the bushings. The resilient element is resiliently deformable such that: the inner bushing is rotatable relative to the outer bushing such that an inner bushing axis can be angled relative to an outer bushing axis; and the inner bushing is axially movable relative to the outer bushing.

19 Claims, 20 Drawing Sheets

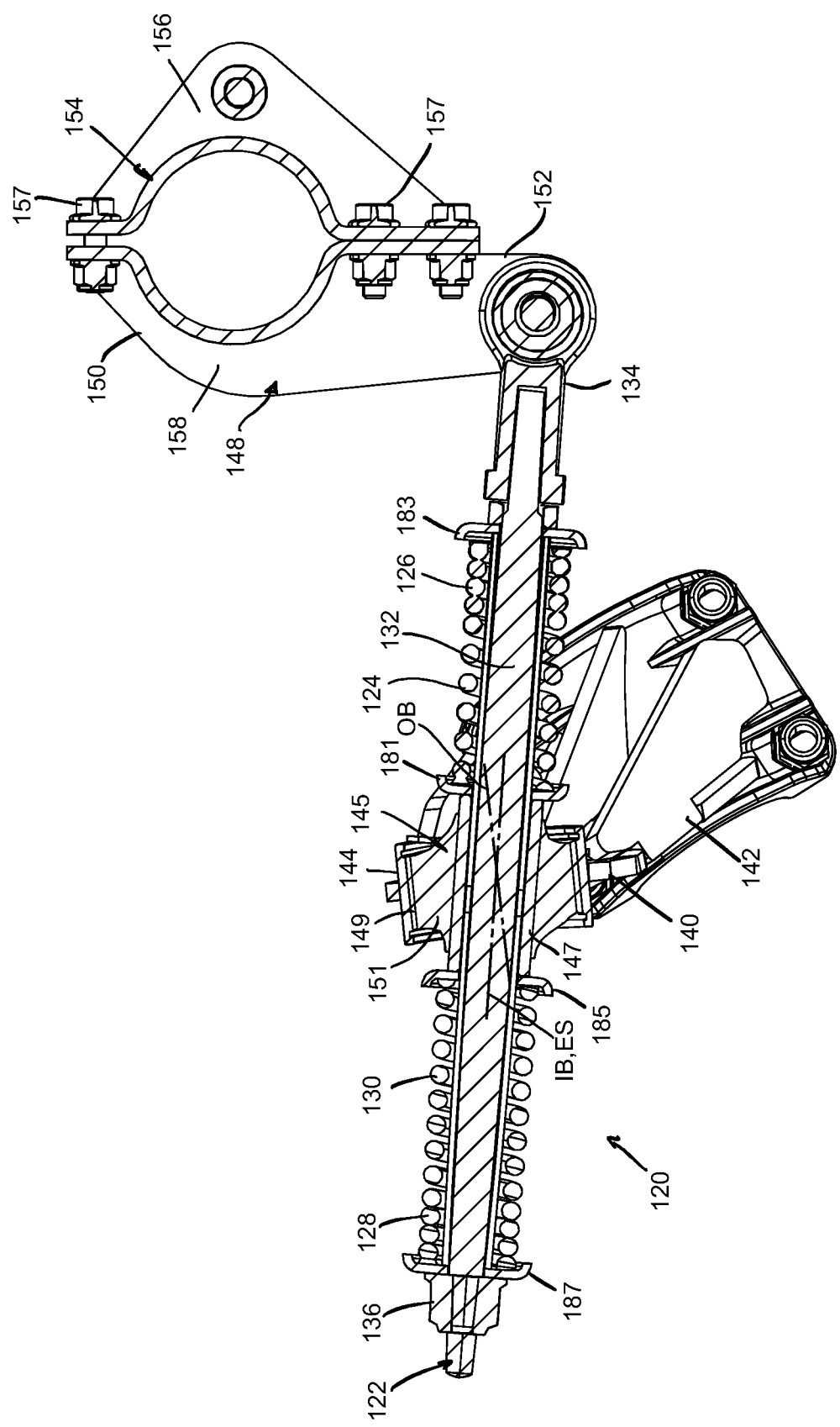

TRACK ASSEMBLY HAVING A ROTATION LIMITING DEVICE AND VEHICLE HAVING SAME

FIELD OF THE TECHNOLOGY

The present technology relates to a track assembly having a rotation limiting device and to a vehicle having such a track assembly.

BACKGROUND

All-terrain vehicles (ATVs) and similar vehicles are used for utility and recreational purposes. Some ATVs are configured to be interchangeably equipped with ground-engaging wheels or track assemblies, such as to allow a user to equip an ATV with either option in accordance with terrain conditions and/or desired handling performance. Track assemblies are particularly useful for instance when travelling over deep snow as the increased contact area between the track assemblies' tracks and the ground allows for greater floatation.

To facilitate travel over rough terrain, track assemblies are designed to pivot about a drive wheel axis thereof which allows the track assemblies to overcome obstacles such as fallen trees, rocks, uneven ground, etc. by climbing over them. In order to prevent the track assemblies from coming into contact with the body of the ATV (and any ensuing damage therefrom) as they pivot about their respective drive wheel axes, each track assembly will typically be provided with a rotation limiting device (also commonly referred to as an "anti-rotation device") to limit the rotation of the track assembly about the drive wheel axis. Notably, such conventional rotation limiting devices are connected between a frame of the ATV and the track assembly. However, in some cases, the frame of the ATV may not lend itself to be readily connected to the rotation limiting device. For instance, the frame of the ATV may be designed in such a way that a distance between the rotation limiting device and any suitable location on the frame for connection to the rotation limiting device may be too great such that such a connection is not easily and/or inexpensively feasible.

In addition, conventional rotation limiting devices, which are typically provided with one or more springs mounted on a stabilizing rod to soften the rotation of the track assembly about the drive wheel axis, can sometimes function improperly as the springs can be subjected to bending moments that impede proper biasing thereof. Conventional rotation limiting devices can also be excessively noisy. Notably, a bushing mounted to the stabilizing and connecting the stabilizing rod to the frame of the track assembly can have a tendency to rattle against the stabilizing rod during operation of the ATV as a relatively large spacing is maintained between the bushing and the stabilizing rod to allow proper rotation between the stabilizing rod and the bushing.

Thus, there is a desire for a track assembly having a rotation limiting device that addresses some of the aforementioned draw backs.

SUMMARY

It is an object of the present technology to ameliorate at least some of the inconveniences present in the prior art.

According to an aspect of the present technology, there is provided a track assembly for a vehicle. The track assembly includes a frame, a plurality of track-contacting wheels, and an endless track disposed around the plurality of track-contacting wheels. The plurality of track-contacting wheels includes a drive wheel rotationally connected to the frame and at least one idler wheel rotationally connected to the frame. The drive wheel defines a drive wheel axis about which the drive wheel is rotatable. The drive wheel is adapted for driving the endless track. The track assembly also includes a rotation limiting device for limiting rotation of the track assembly relative to a frame of the vehicle about the drive wheel axis. The rotation limiting device is connectable between the frame of the track assembly and the vehicle. The rotation limiting device includes: an elongate support extending along a support axis and having a first end and a second end: a first biasing member mounted to the elongate support; and a second biasing member mounted to the elongate support. The track assembly also includes a connection bracket for connecting the rotation limiting device to the frame of the track assembly. The connection bracket has a frame connecting end connected to the frame of the track assembly and a device connecting end connected to the rotation limiting device. The device connecting end is slidably mounted to the elongate support of the rotation limiting device such that: the first biasing member is disposed between the device connecting end and the first end of the elongate support, the first biasing member being compressed between the device connecting end and the first end of the elongate support when the track assembly rotates in a first rotation direction about the drive wheel axis; and the second biasing member is disposed between the device connecting end and the second end of the elongate support, the second biasing member being compressed between the device connecting end and the second end of the elongate support when the track assembly rotates in a second rotation direction about the drive wheel axis. The track assembly also includes a bushing assembly slidably connecting the device connecting end of the connection bracket to the elongate support. The bushing assembly includes: an inner bushing slidably mounted to the elongate support, the inner bushing defining an inner bushing axis: an outer bushing affixed to the device connecting end of the connection bracket, the outer bushing defining an outer bushing axis; and a resilient element connected between the inner and outer bushings. The resilient element is resiliently deformable such that the inner bushing is rotatable relative to the outer bushing such that the inner bushing axis can be angled relative to the outer bushing axis with the inner bushing axis remaining one of: generally parallel to the support axis of the elongate support, and generally coaxial to the support axis of the elongate support. The resilient element is also resiliently deformable such that the inner bushing is axially movable relative to the outer bushing along the support axis of the elongate support.

In some embodiments, at least one of the first and second biasing members is a spring.

In some embodiments, the rotation limiting device also includes at least one spring seat supporting the at least one of the first and second biasing members. The at least one spring seat is disposed between the inner bushing and the at least one of the first and second biasing members. The at least one spring seat remains oriented generally perpendicular to the support axis of the elongate support.

In some embodiments, the at least one of the first and second biasing members is a dual rate spring.

In some embodiments, the first and second biasing members are springs.

In some embodiments, the resilient element is made of rubber.

In some embodiments, the resilient element defines at least one opening offset from the outer bushing axis. The at least one opening extends axially from a first end to a second end of the resilient element.

In some embodiments, the at least one opening has a curved elongated shape.

In some embodiments, the inner bushing has a first stopper extending radially toward the outer bushing and the outer bushing has a second stopper extending radially toward the inner bushing. The first and second stoppers are at least partly circumferentially and radially aligned with one another such that movement of the inner bushing relative to the outer bushing is limited as the first and second stoppers approach one another.

In some embodiments, one of the inner bushing and the outer bushing has a third stopper extending radially. The third stopper is at least partly circumferentially and radially aligned with the first and second stoppers. When the outer bushing has the third stopper, the first stopper is disposed axially between the third stopper and the second stopper, and movement of the inner bushing relative to the outer bushing is limited when the first stopper approaches the second stopper or the third stopper. When the inner bushing has the third stopper, the second stopper is disposed axially between the third stopper and the first stopper, and movement of the inner bushing relative to the outer bushing being limited when the second stopper approaches the first stopper or the third stopper.

In some embodiments, the first biasing member has a first biasing rate, and the second biasing member has a second biasing rate. The resilient element has a third biasing rate that is greater than the first and second biasing rates.

In some embodiments, the first biasing member has a first biasing rate and the second biasing member has a second biasing rate. The resilient element has a third biasing rate that is less than the first and second biasing rates.

In some embodiments, the inner bushing is longer than the outer bushing.

In some embodiments, the inner bushing is thicker than the outer bushing.

In some embodiments, an outer surface of the resilient element is shorter than the outer bushing.

In some embodiments, an inner surface of the resilient element is shorter than the inner bushing.

In some embodiments, the inner surface of the resilient element is longer than the outer bushing.

In some embodiments, the resilient element is annular and has a generally trapezoidal cross-section.

According to another aspect of the present technology, there is provided a vehicle including a vehicle frame, a motor supported by the vehicle frame, a suspension assembly connected to the vehicle frame, and the track assembly defined above connected to the suspension assembly.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 15A is a cross-sectional view of the rotation limiting device of FIG. 13 in a state in which a bushing assembly of the left rear track assembly is rotatably biased:

DETAILED DESCRIPTION

The present technology will be described with reference to a four-wheeled straddle-seat all-terrain vehicle (ATV) 10. However, it is contemplated that aspects of the present technology could be used in other types of off-road vehicles, such as side-by-side vehicles, dune buggies, and the like.

Figure 1:
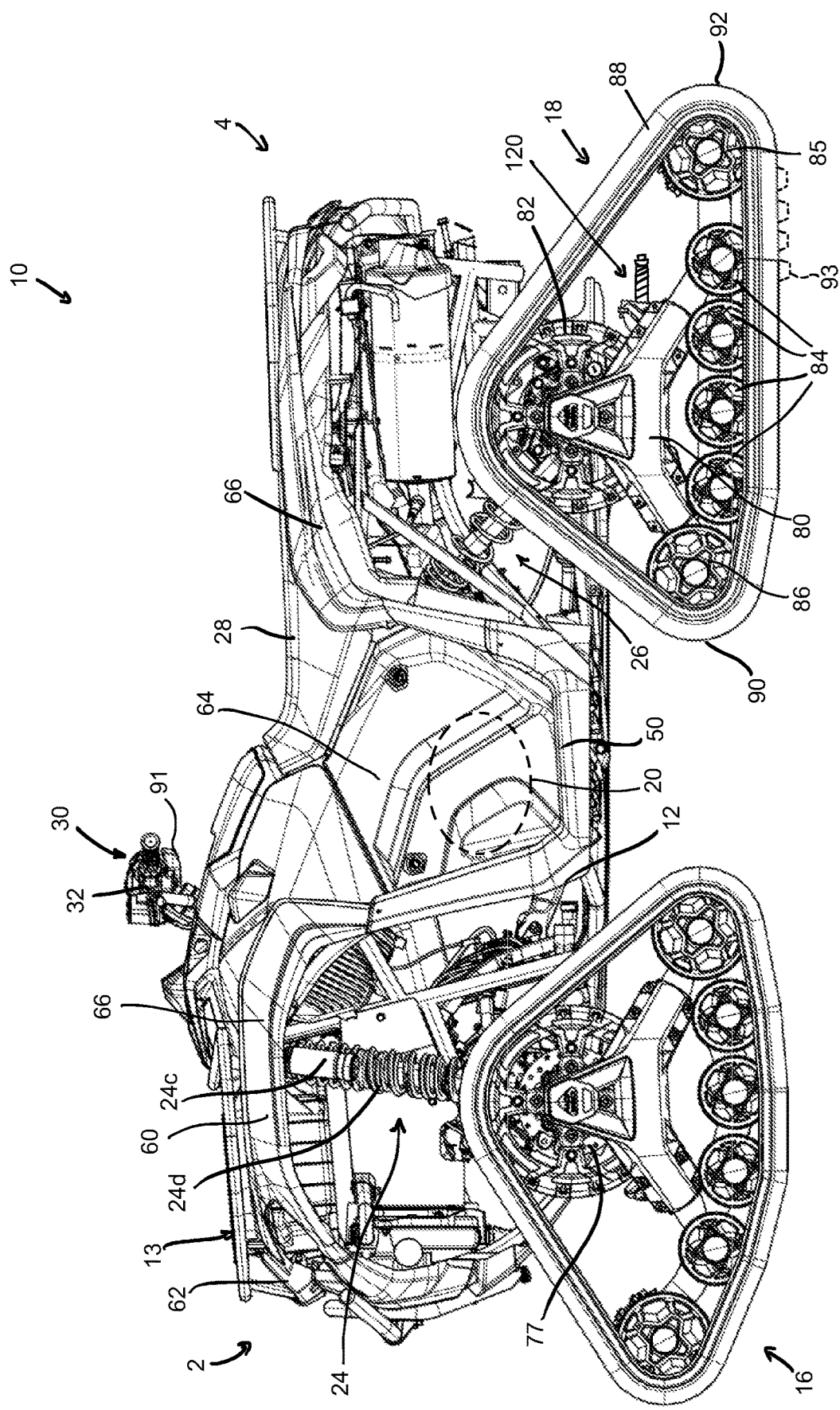
FIG. 1 is a left side elevation view of an all-terrain vehicle (ATV) provided with track assemblies.
Figure 4:
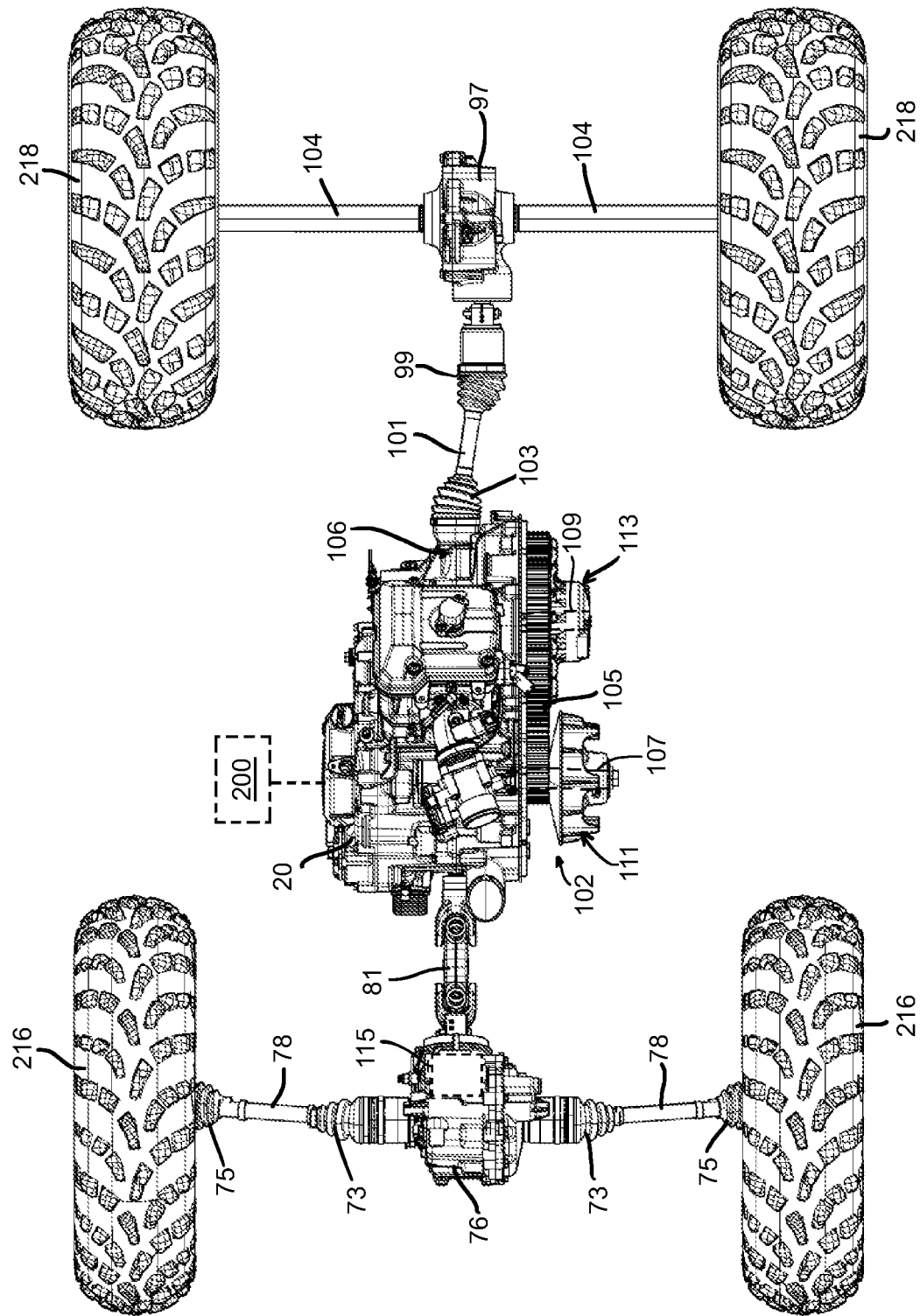
FIG. 4 is a top plan view of part of a powertrain of the vehicle of FIG. 1, with the vehicle provided with ground-engaging wheels.
Figure 5:
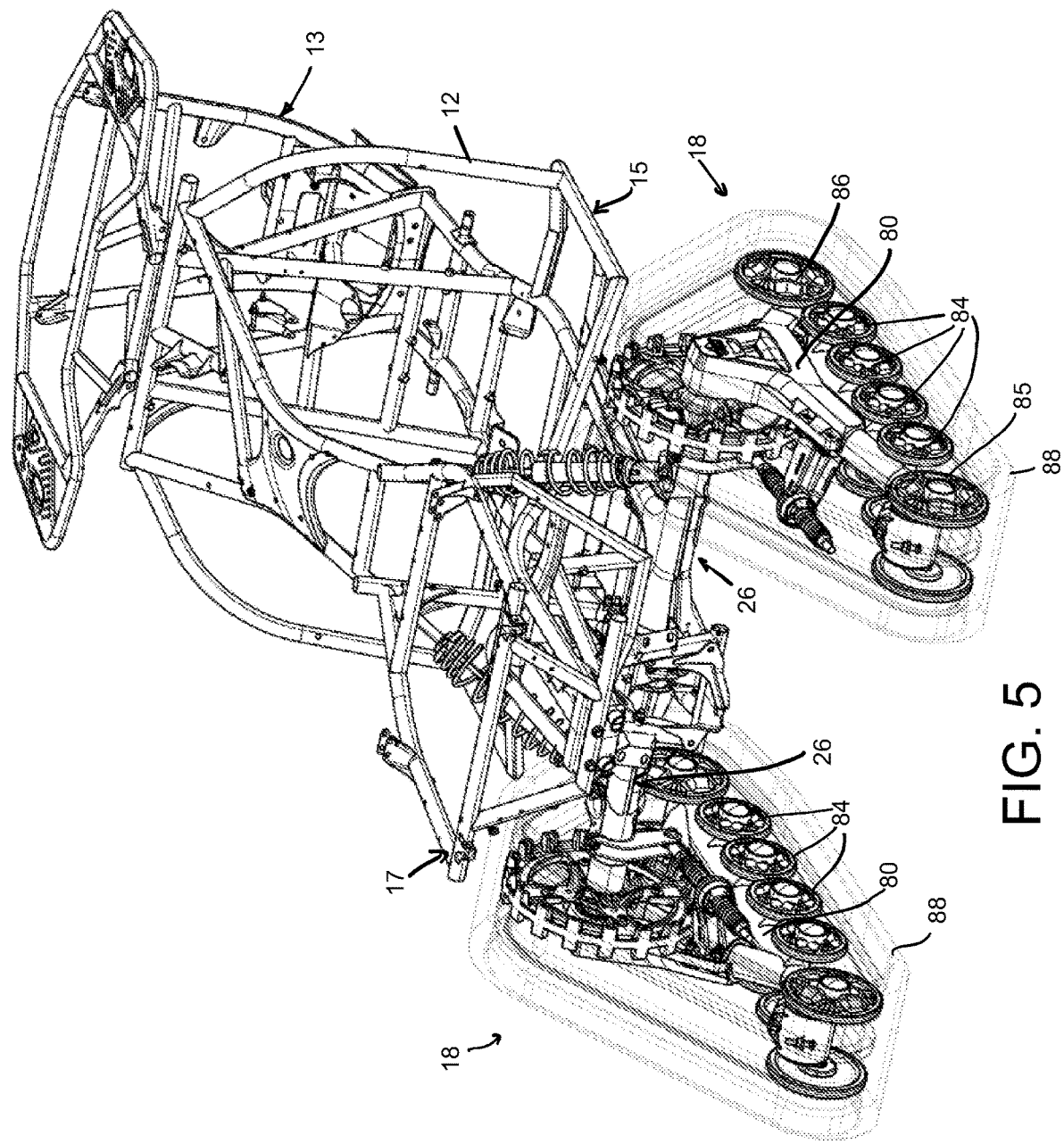
FIG. 5 is a perspective view, taken from a rear right side, of the frame, rear suspension assemblies and rear track assemblies of the vehicle of FIG. 1, with the endless tracks of the rear track assemblies shown in transparency.

With reference to FIG. 1, the ATV 10 has a front end 2 and a rear end 4 defined consistently with a forward travel direction of the ATV 10. The ATV 10 has a frame 12 to which a vehicle body is mounted. The frame 12 has a front portion 13, a middle portion 15 and a rear portion 17. A pair of front track assemblies 16 is suspended from the front portion 13 of the frame 12 via front suspension assemblies 24. A pair of rear track assemblies 18 is suspended from the middle portion 15 of the frame 12 via rear suspension assemblies 26. As will be discussed in greater detail below, the front and rear track assemblies 16, 18 are interchangeably replaceable by front and rear ground-engaging wheels 216, 218 (as shown in FIG. 4) including tires adapted for off-road conditions and traversing rugged terrain. As such, a user can choose to install the track assemblies 16, 18 or the ground-engaging wheels 216, 218 on the ATV 10 depending on terrain conditions.

As illustrated in FIG. 1, the ATV 10 also includes fairings 60 including a front fascia 62 at the front end 2 of the ATV 10 and several side panels 64 extending over lateral sides of the ATV 10. A fender 66 is disposed over each wheel well overarching the track assemblies 16, 18 to protect the driver and/or passenger from dirt, water and other debris being projected by the track assemblies 16, 18 (or the ground-engaging wheels 216, 218). The ATV 10 further includes a straddle-type driver seat 28 mounted to the frame 12 for accommodating a driver of the ATV 10. Driver footrests 50 are provided on either side of the driver seat 28 and are disposed vertically lower than the driver seat 28 to support the driver's feet. Another straddle-type passenger seat may be provided behind the driver seat 28 to accommodate a passenger.

Figure 2:
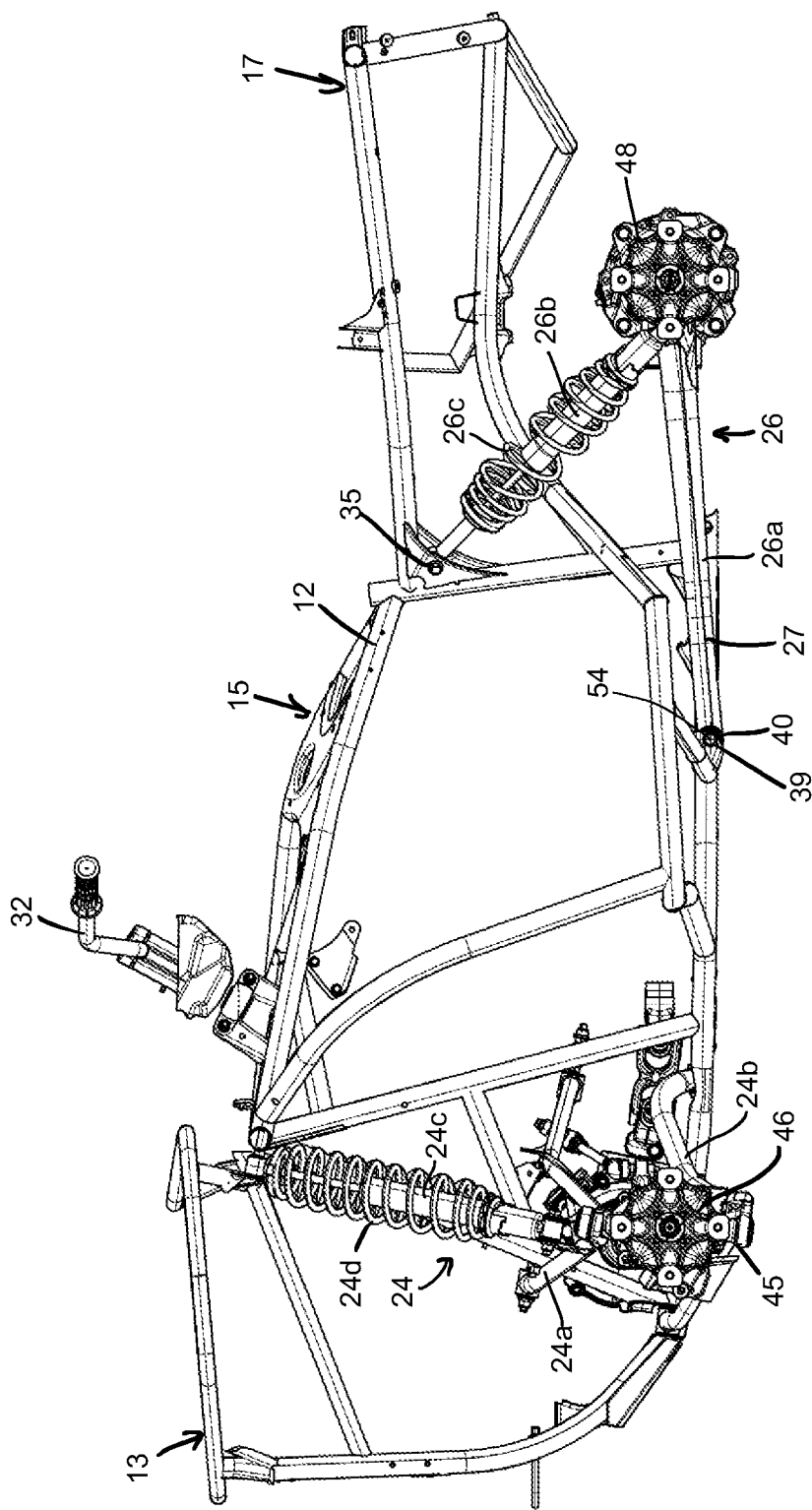
FIG. 2 is a left side elevation view of a frame, suspension assemblies and certain steering components of the vehicle of FIG. 1.
Figure 3:
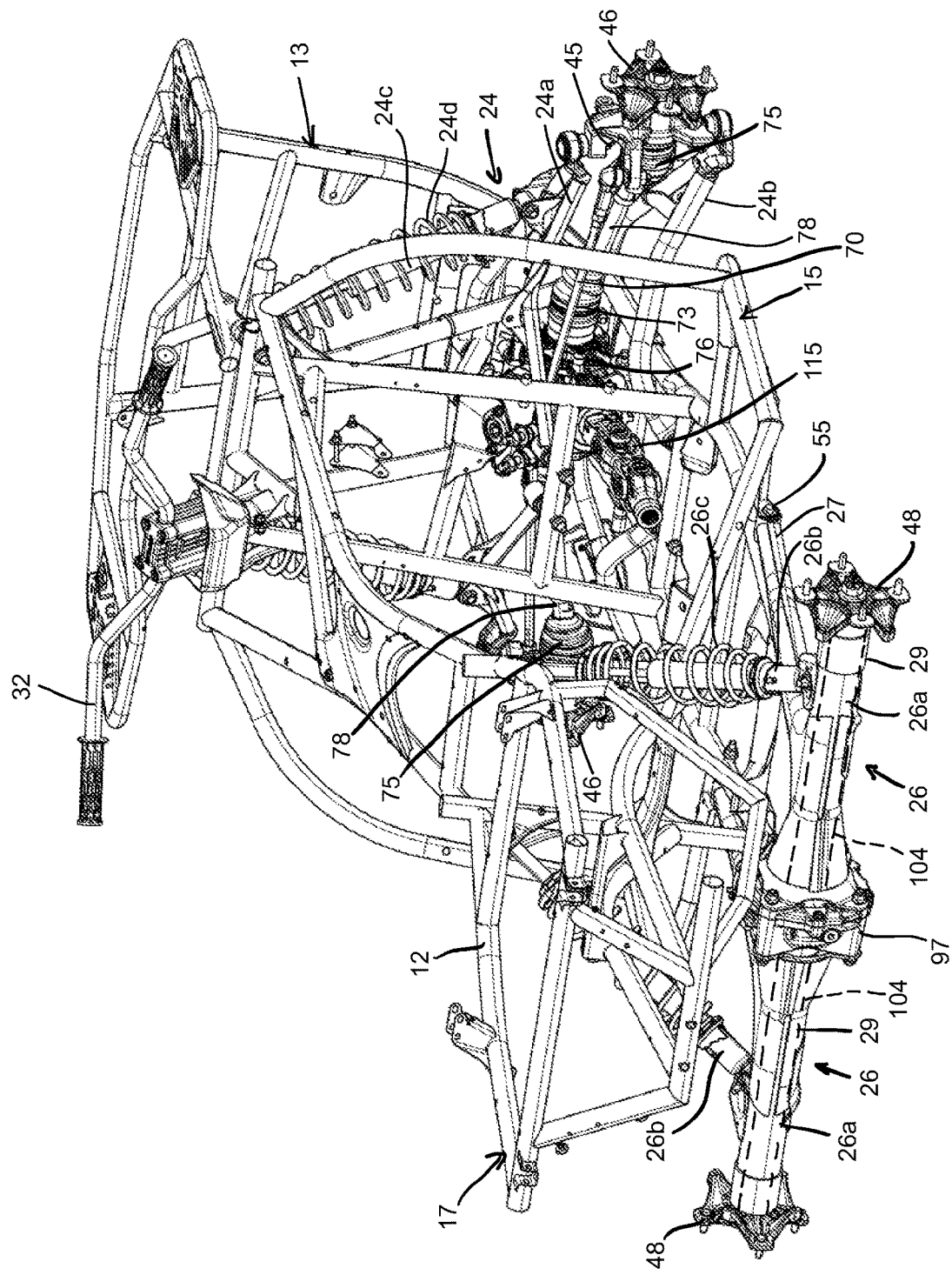
FIG. 3 is a perspective view, taken from a rear right side, of the components of FIG. 2.

As shown in FIGS. 2 and 3 each front suspension assembly 24 includes an upper A-arm 24a, a lower A-arm 24b, a front shock absorber 24c and a front coil spring 24d. The front coil spring 24d is mounted over the front shock absorber 24c. The front coil spring 24d and the front shock absorber 24c are both pivotably connected at their lower ends to the upper A-arm 24a and at their upper ends to the frame 12. The upper and lower A-arms 24a, 24b each have one end pivotably connected to the frame 12 while a steering knuckle 45 (FIG. 3) is mounted to the opposite ends of the upper and lower A-arms 24a and 24b. A drive hub assembly 46 is mounted to the steering knuckle 45 for connecting a corresponding one of the front track assemblies 16 or the front ground-engaging wheels 216 thereto.

Figure 6:
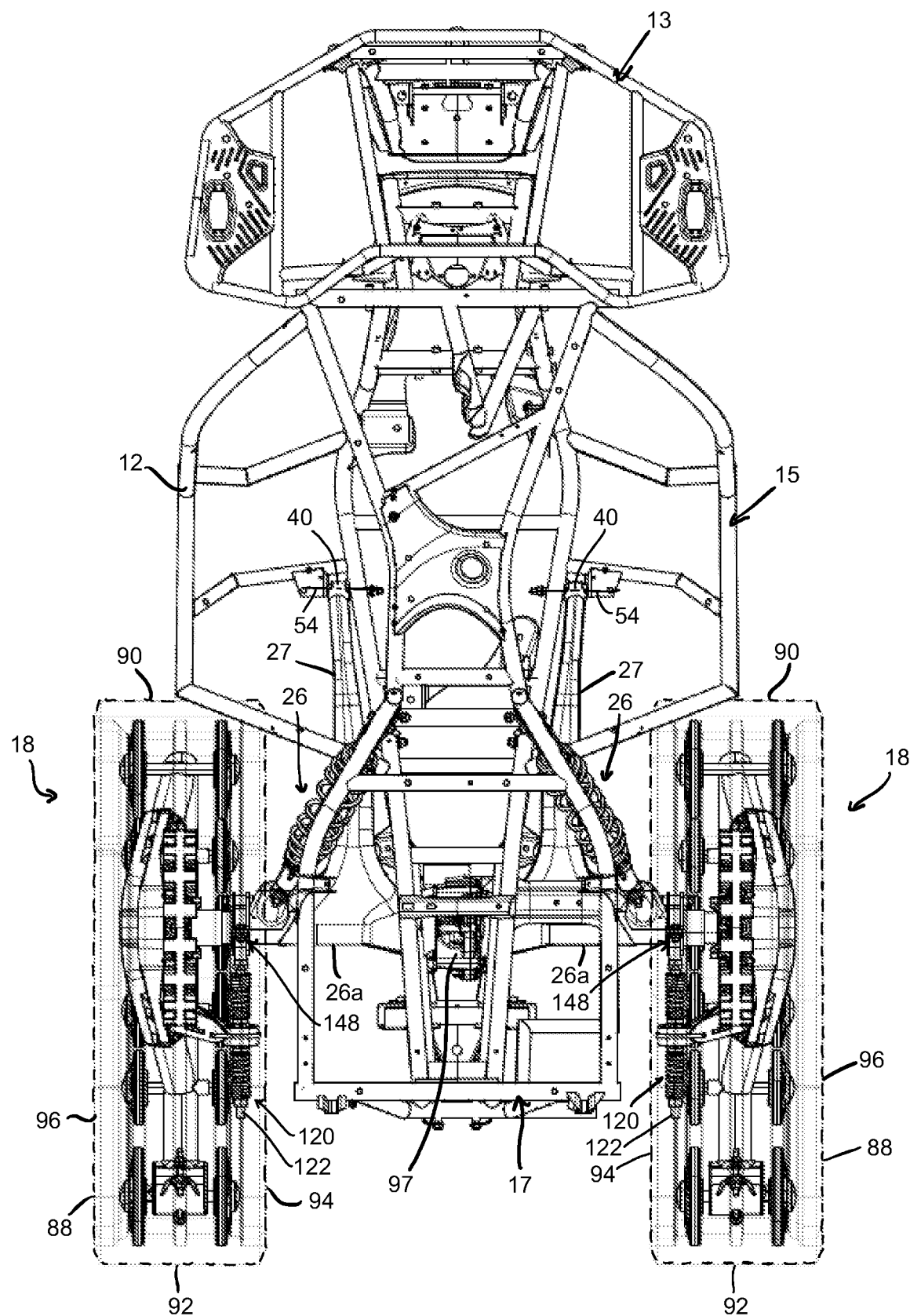
FIG. 6 is a top plan view of the components of FIG. 5.
Figure 10:
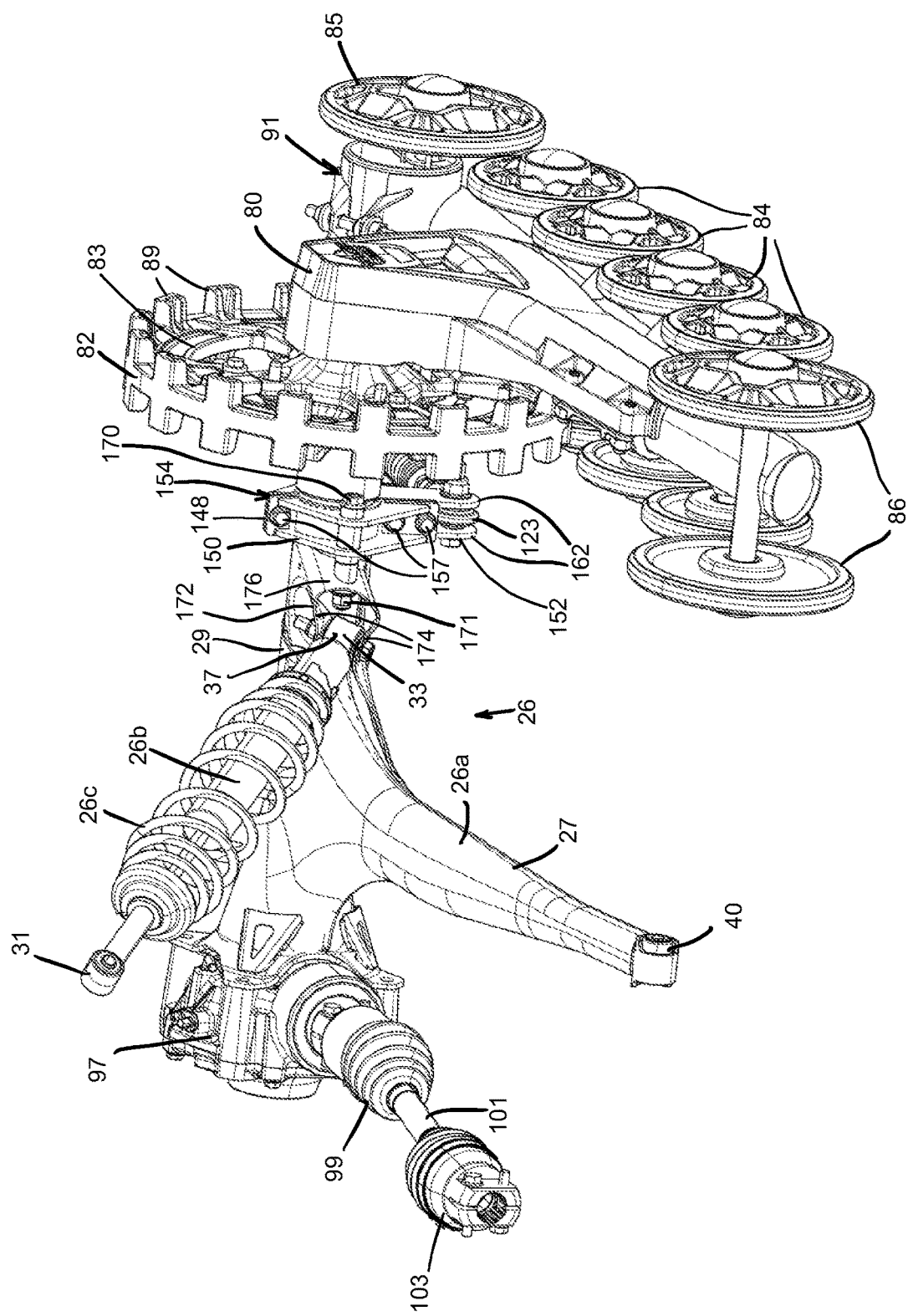
FIG. 10 is a perspective view, taken from a front left side, of the components of FIG. 9 with a shock absorber and a coil spring of the left suspension assembly shown.

As shown in FIGS. 2, 3, 6 and 7, each rear suspension assembly 26 comprises a suspension arm 26a, a rear shock absorber 26b and a rear coil spring 26c. The rear coil spring 26c is mounted over the rear shock absorber 26b. For each rear suspension assembly 26, the rear shock absorber 26b has an upper end 31 pivotably connected to the frame 12 at a pivot 35 (FIG. 2) and a lower end 33 pivotably connected to the suspension arm 26a at a pivot 37 (FIG. 10). Each suspension arm 26a has a longitudinally-extending portion 27 and a laterally-extending portion 29. A front end 40 of the longitudinally-extending portion 27 of the suspension arm 26a is pivotably connected to the middle portion 15 of the frame 12 about a pivot axis 54 extending generally laterally. Notably, as shown in FIGS. 3 and 6, a fastener 55 extends through the front end 40 of the longitudinally-extending portion 27 and through a flange of the frame 12. A pivot 39, formed between the front end 40 and the frame 12 and defining the pivot axis 54, is vertically lower than the pivot 35.

The laterally-extending portion 29 of the suspension arm 26a is connected to a rear end of the longitudinally-extending portion 27. The laterally-extending portion 29 is connected to a rear differential 97 (which will be described in greater detail below) such that the rear differential 97 moves together with the suspension arm 26a relative to the frame 12. As shown in FIG. 3, the laterally-extending portion 29 also encloses a half shaft 104 that is operatively connected between the corresponding rear track assembly 18 and the rear differential 97. Notably, a rear drive hub assembly 48 is operatively connected to the half shaft 104 and rotates therewith.

A steering assembly 30 is rotationally supported by the frame 12 to enable a driver to steer the ATV 10. The steering assembly 30 includes a handlebar assembly including a handlebar 32 connected to a steering column (not shown) for actuating steering linkages 70 operably connected to the left and right front track assemblies 16. In this embodiment, the steering assembly 30 includes a power steering electric motor mounted to the steering column for facilitating steering. The power steering electric motor is operatively connected to the steering column and to the left and right front track assemblies 16 via the steering linkages 70.

As shown in FIG. 1, a throttle operator 91 in the form of a thumb-actuated throttle lever is provided near the right end of the handlebar 32. Other types of throttle operators, such as a finger-actuated throttle lever and a twist grip, are also contemplated. The throttle operator 91 is selectively actuated by the driver of the ATV 10 to request throttle from the engine. More specifically, a throttle operator position sensor (not shown) is operatively connected to the throttle operator 91 to sense 10 movement thereof caused by the driver in operation. The sensed input from the throttle operator position sensor is transmitted to an electronic control unit (ECU) 200, shown in FIG. 4, which controls operation of the ATV's motor 20.

A motor 20 (schematically shown in FIG. 1) is mounted to the middle portion of the frame 12 and, as will be described in greater detail below, is operatively connected to the front and rear track assemblies 16, 18 in order to propel the ATV 10. In this embodiment, the motor 20 is an internal combustion engine, and in particular a V-type engine having two cylinders. The cylinders are disposed at an angle to each other. Each cylinder has an intake port (not shown) connected to an air induction system delivering air into the engine 20. Each cylinder has a fuel injector injecting fuel into the engine 20 and a spark plug igniting the fuel-air mixture to initiate the combustion cycle. Each cylinder has an exhaust port connected to an exhaust manifold through which the exhaust gases are removed from the engine 20. It is contemplated that other types of internal combustion engine could be used, such as, for example, an inline engine. It is also contemplated that the engine 20 could have more than two cylinders.

The engine air induction system feeds air to the engine 20 in a known manner and will thus not be described in detail here. Notably, a throttle valve is controlled by the ECU 200 to adjust the air being fed to the engine 20 in response to input by the driver at the throttle operator 91.

It is contemplated that the engine 20 could instead be a different type of motor in other embodiments. For example, in some embodiments, the engine 20 could instead be an electric motor, in which case the engine air induction or air exhaust systems may be omitted.

With reference to FIG. 4, which illustrates part of a powertrain of the ATV 10, the powertrain of the ATV 10 includes the engine 20, a continuously variably transmission (CVT) 102 and a transmission 106. An output shaft 107 (shown in dashed lines in FIG. 4) of the engine 20 is connected to the CVT 102 which, as will be described in greater detail below, is in turn connected to the transmission 106.

A gear selector handle (not shown) is configured to be selectively moved between positions P, N, R, L, H (respectively corresponding to a parking, neutral, reverse, low and high gears) and allows the driver of the ATV 10 to make a gear selection. It is contemplated that the sequence of gears could be different. The gear selector handle is connected to the transmission 106 for effecting the gear selection. The transmission 106 is disposed rearward of the engine 20. The transmission 106 transfers torque from the transversely extending driven shaft 109 to the longitudinally extending front and rear driveshaft (not shown). The transmission 106 includes different gear sets, the combination of the gear sets being selected based on the position of the gear selector.

As shown in FIG. 4, the CVT 102 is disposed on a left side of the engine 20. The CVT 102 includes a drive pulley 111 disposed on the output shaft 107 of the engine 20, a driven pulley 113 disposed on a driven shaft 109 (shown in dashed lines in FIG. 4) for rotation therewith, and a CVT belt 105 disposed around both pulleys 111, 113 to transmit torque from the drive pulley 111 to the driven pulley 113. A cover (not shown) disposed over the CVT 102 is connected to both the engine 20 and the transmission 106. The driven shaft 109 is connected to the transmission 106 for transmitting thereto the torque output of the engine 20.

Each of the pulleys 111, 113 includes a movable sheave that can move axially relative to a fixed sheave to modify an effective diameter of the corresponding pulley 111, 113. The drive pulley 111 is a centrifugal pulley in that the sheaves thereof move in response to a centrifugal force applied thereon caused by changes in engine speed and torque requirement of the wheels 16, 18. The effective diameters of the pulleys 111, 113 are in inverse relationship. In the illustrated embodiment, the CVT 102 is a purely mechanical CVT 102, in which the diameter of the drive pulley 111 increases with increasing rotational speed of the drive pulley 111 (i.e. with increasing engine speed). The diameter of the driven pulley 113 therefore decreases when the torque required at the driven shaft 109 (connected to the wheels 16, 18) increases. The CVT 102 may thus be referred to as an "unassisted" CVT in that a gear ratio of the CVT 102 (i.e., an effective diameter of the driven pulley 113 over the effective diameter of the drive pulley 111) is automatically mechanically adjusted in accordance with the speed of the engine 20 and the torque requirement of the wheels 16, 18. It is contemplated that a different type of CVT could be provided. It is also contemplated that the CVT 102 and the transmission 106 could be replaced by different transmission components.

In this embodiment, the front and rear track assemblies 16, 18 are operatively connected to the engine 20 to propel the ATV 10 on the ground. More specifically, as shown in FIG. 4, the ATV 10 has a front differential 76 adapted to receive, via a driveshaft 81 a torque from the engine 20. With reference to FIGS. 3 and 4, on each of its left and right sides, the front differential 76 is connected to a constant velocity (CV) joint 73 connected to one end of a respective half shaft 78. Another CV joint 75 is connected to an opposed end of each half shaft. As shown in FIG. 3, each half shaft 78 is operatively connected to a corresponding steering knuckle 45 by a drive wheel shaft (not shown) that is connected to a corresponding one of the CV joints 75. A front disc 77 (FIG. 1) is mounted to each hub assembly 46 which is connected to its corresponding drive wheel shaft. On each side of the front differential 76, the front track assembly 16, the disc 77, the CV joint 73, the half shaft 78 and the CV joint 75 are operably connected to rotate together, at a common speed. The torque from the engine 20 is received at the driveshaft 81 (which may be referred to as an "input" shaft of the front differential 76) when the ATV 10 is in the four-wheel drive mode. In turn, the front differential 76 transmits the torque to the front track assemblies 16 (or the front wheels 216) via the CV joints 73, the front half shafts 78, the CV joints 75 and the drive wheel shafts.

Depending on riding conditions, the front differential 76 may send unequal torque to the two front track assemblies 16 (or the front wheels 216) so that the left front track assembly 16 and the right front track assembly 16 may rotate at different speeds.

Left and right front brake assemblies include the discs 77 and further include calipers mounted on the steering knuckles 45. The calipers include brake pads and are operable to cause the brake pads to apply pressure on the respective discs 77.

Figure 9:
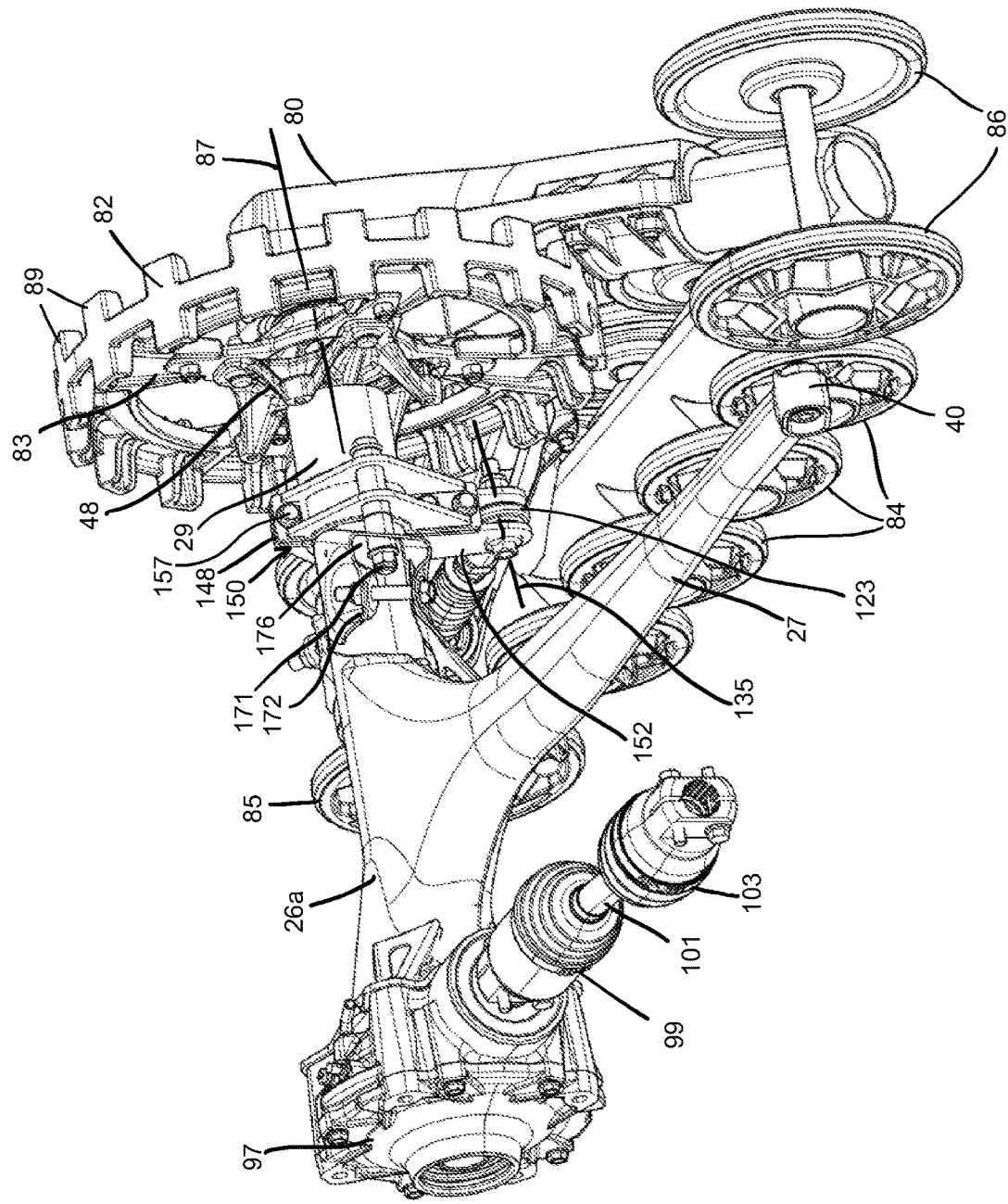
FIG. 9 is a perspective view, taken from a front right side, of a rear differential, part of the left rear suspension assembly, and part of the left rear track assembly of the vehicle of FIG. 1.

As shown in FIGS. 3 and 4, the ATV 10 includes a rear differential 97. An input shaft 100 (FIG. 7) of the rear differential 97 is operably connected to a shaft 101 by a universal joint 99 (FIGS. 4 and 9). The shaft 101 is connected by a universal joint 103 (FIGS. 4 and 9) to the transmission 106 to receive an input torque from the engine 20. As shown in FIG. 4, on each of its left and right sides, the rear differential 97 is operatively connected to a respective half shaft 104. Each half shaft 104 is connected at a distal end to one of the rear drive hub assemblies 48. As shown in FIG. 3, each half shaft 104 extends within the laterally-extending portion 29 of one of the suspension arms 26a.

The ATV 10 can be operated in a rear-wheel drive mode (i.e., a two-wheel drive mode) in which the rear track assemblies 18 (or rear wheels 218) are driven by the engine 20 or in a four-wheel drive mode in which the front and rear track assemblies 16, 18 (or front and rear wheels 216, 218) are driven by the engine 20. To that end, in this embodiment, the transmission 106 is selectively connected to the front track assemblies 16 via a drive mode coupler 115, shown schematically in FIG. 4. The drive mode coupler 115 is controlled by the user and is selectively actuated to cause the ATV 10 to change from the two-wheel drive mode configuration to the four-wheel drive mode configuration by selectively coupling the front track assemblies 16 (or front wheels 216) to the transmission 106 for selectively driving the front track assemblies 16. Such drive mode couplers are known in the art and will thus not be described in detail herein.

Therefore, when the ATV 10 is in the two-wheel drive mode, a torque output of the engine 20 is applied via the CVT 102 and the transmission 106 to the left and right rear track assemblies 18 (or left and right rear wheels 218). Conversely, when the ATV 10 is in the four-wheel drive mode, a portion of the torque output of the engine 20 is applied to each of the front track assemblies 16 and rear track assemblies 18 (or front and rear wheels 216, 218) via the CVT 102 and the transmission 106.

The selection between the drive modes is made by the driver using a drive mode switch provided in the vicinity of the driver of the ATV 10. In this embodiment, the drive mode switch is a toggle switch mounted on a dashboard of the ATV 10.

It is contemplated that, in some embodiments, only the front drive hub assemblies 46 or only the rear drive hub assemblies 48 may be operatively connected to the engine 20 such that only the front track assemblies 16 or only the rear track assemblies 18 (alternatively, only the front wheels 216 or only the rear wheels 218) are driven by the engine 20.

It is contemplated that the ATV 10 could be configured differently in other embodiments. The illustrated construction of the ATV 10 is thus not considered to be limiting to the present technology.

The rear track assemblies 18 will be described in more detail below with reference to FIGS. 5 to 10. As the left and right rear track assemblies 18 are mirror images of one another, only the left rear track assembly 18 will be described in detail below. It is understood that the right rear track assembly 18 is configured similarly to the left rear track assembly 18.

Figure 7:
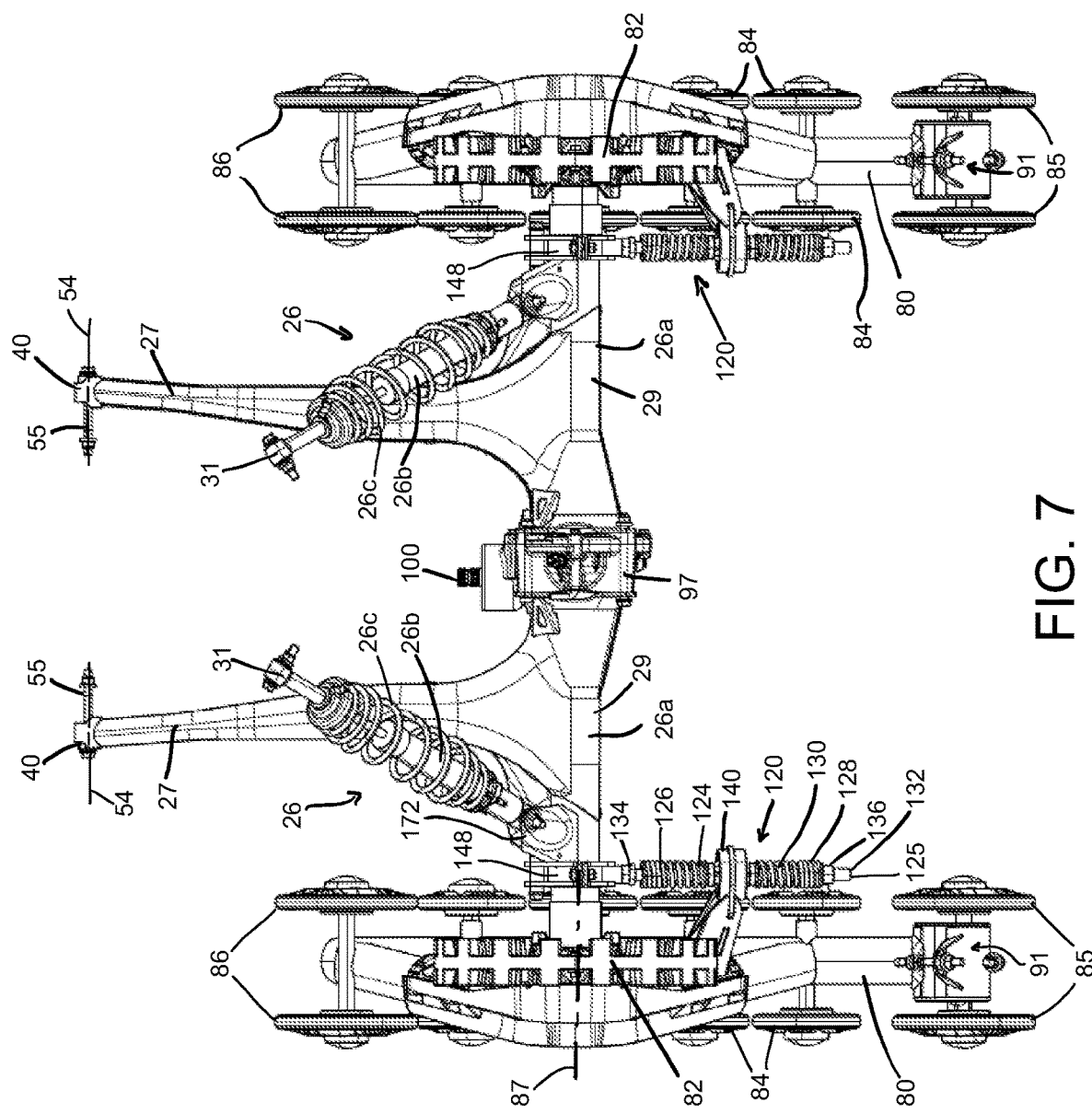
FIG. 7 is a top plan view of the rear suspension assemblies and the rear track assemblies of the vehicle of FIG. 1, with the endless tracks of the rear track assemblies removed.
Figure 8:
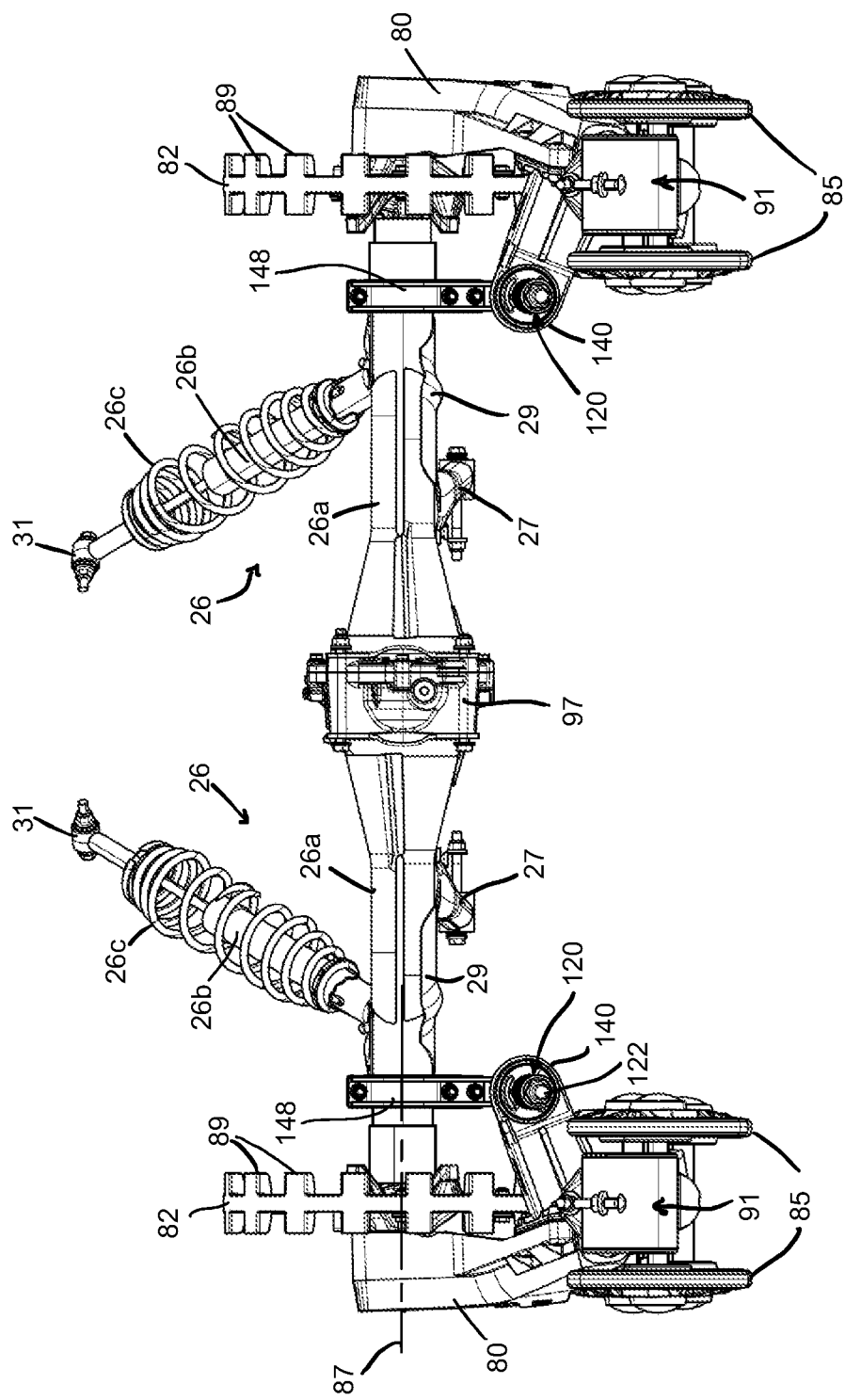
FIG. 8 is a rear elevation view of the components of FIG. 7.

As shown in FIGS. 9 and 10, the rear track assembly 18 has a frame 80 and a plurality of track-contacting wheels including a drive wheel 82, eight middle idler wheels 84, a pair of rear corner idler wheels 85 and a pair of front corner idler wheels 86. The track-contacting wheels 82, 84, 85, 86 are rotationally connected to the frame 80. An endless track 88 is disposed around the track-contacting wheels 82, 84, 85, 86 which define the path over which the track 88 moves. The path of the track 88 is defined in the upper portion by the drive wheel 82, in the rearward and forward portions by the rear and front corner idler wheels 85, 86, and in the bottom portion by the middle idler wheels 84. The track-contacting wheels 82, 84, 85, 86 are positioned so as to keep the track 88 tensioned. In particular, as shown in FIGS. 6 and 7, the track assembly 18 includes a track tensioning device 91 which is operable to adjust the longitudinal position of the rear corner idler wheels 85 such as to modify the tension of the track 88.

In the illustrated embodiment, the idler wheels 84, 85, 86 are arranged in pairs of laterally spaced and longitudinally aligned left and right idler wheels. It is contemplated that at least some of the pairs of idler wheels 84, 85, 86 could be a single wheel centered relative to the track 88. In the illustrated embodiment, the track assembly 18 has four pairs of middle idler wheels 84. It is however contemplated that there could be more or less than four pairs of middle idler wheels 84. It is contemplated that some of the left and right middle idler wheels 84 could not be arranged as pairs of longitudinally aligned wheels.

The corner idler wheels 85, 86 are larger in diameter than the middle idler wheels 56. The large diameter of the corner idler wheels 85, 86 helps to push snow on the ground ahead of the ATV 10 under the ATV 10 and also aids the ATV 10 in moving over obstacles. It is also contemplated that the relative size of the track-contacting wheels 82, 84, 85, 86 could be different than as shown.

The drive wheel 82 has a hub 83 that is mounted to the respective drive hub assembly 48. As such, the corresponding half shaft 104 operatively connects the differential 97 to the drive wheel 82 (via the drive hub assembly 48). The drive wheel 82 is laterally centered with respect to the track 88. The drive wheel 82 drives the track 88 by means of projections 89 extending laterally outwards from its rim and which engage complementary inner lugs (not shown) on the inner surface of the track 88. The drive wheel 82 drives the track 88 over the idler wheels 84, 85, 86 thereby propelling the ATV 10 over the ground. More specifically, the drive wheel 82 defines a drive wheel axis 87 extending laterally about which the drive wheel 82 rotates to cause the track 88 to turn about the track-contacting wheels 82, 84, 85, 86. The drive wheel 82 is rotationally connected to an upper portion of the frame 80 via roller bearings (not shown) so that the drive wheel 82 can rotate about the axis 87 without rotating the frame 80 or any part thereof. The track assembly 18 has limited rotation about the drive wheel axis 87 relative to the suspension arm 26*a*.

While in this embodiment the drive wheel 82 is a sprocket wheel it is contemplated that other types of drive wheels could be used in other embodiments.

As shown in FIG. 6, the track assembly 18 has a front longitudinal end 90 and a rear longitudinal end 92 which define the length of the track assembly 18. The width of the track assembly 18 is defined by a width of the track 88 measured between an inner lateral edge 94 and an outer lateral edge 96 of the track 88 (the outer lateral edge 96 being the lateral edge facing outwardly away from a center of the ATV 10 while the inner lateral edge 94 faces inwardly towards the center of the ATV 10).

The track 88 has a body including elastomeric material (e.g., rubber) and reinforcements embedded within the elastomeric material. The inner surface of the track 88 has the inner lugs projecting inwardly and which contact at least some of the track-contacting wheels for driving and/or guiding the track 88. More particularly, in this embodiment, the inner lugs of the track 88 are configured to mesh with the projections 89 of the drive wheel 82 as described above. The outer surface of the track 88 has outer ground-engaging lugs 93 (partially shown in dashed lines in FIG. 1) for providing traction on the ground.

It is contemplated that, in other embodiments, the track assembly 18 could be configured differently from that described above. For example, any of the track-contacting wheels and the frame 80 could have any other suitable configuration in other embodiments. Thus, the construction of these components of the track assembly 18 is not considered to be limiting to the present technology.

As will be described with reference to FIGS. 7 to 17, the track assembly 18 has a rotation limiting device 120 for limiting rotation of the track assembly 18 relative to the suspension arm 26*a*. To that end, and as will be described in greater detail below, the rotation limiting device 120 is connected between the frame 80 of the track assembly 18 and the suspension arm 26*a*.

As shown in FIG. 6, in this embodiment, the rotation limiting device 120 is contained within a volume defined by the track 88. Notably, the rotation limiting device 120 is entirely disposed laterally between the inner and outer lateral edges 94, 96 of the track 88. More specifically, the rotation limiting device 120 is entirely disposed laterally between the drive wheel 82 and the inner lateral edge 94 of the track 88. As the rotation limiting device 120 is confined to be within the volume defined by the track 88, ground clearance (between the ground and the components of the ATV 10) is not affected thereby. Furthermore, this compact structure of the rotation limiting device 120 can make it cheaper to manufacture than if the rotation limiting device 120 were to be designed to be connected to the frame 12 as in conventional rotation limiting devices.

Figure 13:
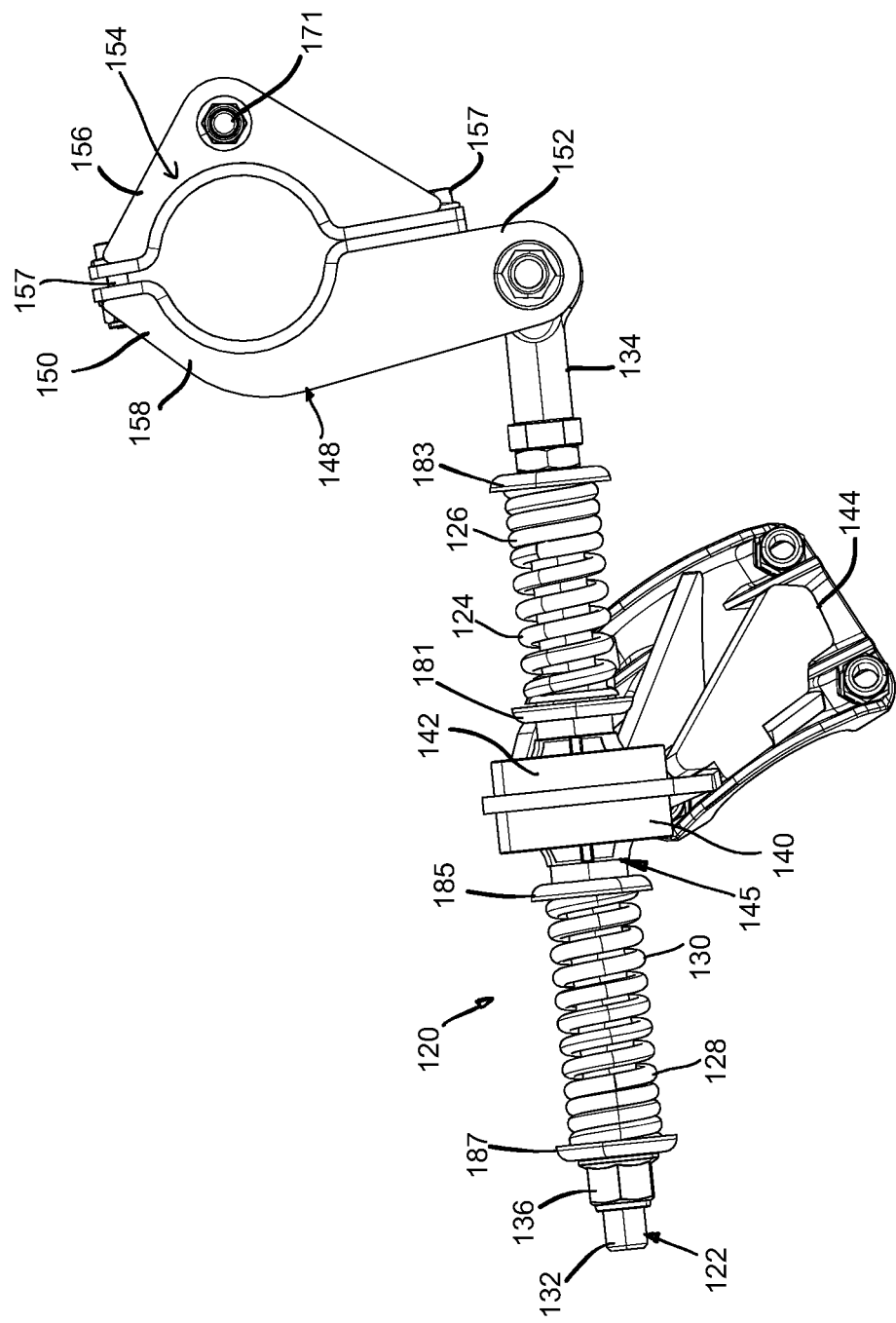
FIG. 13 is a right side elevation view of a rotation liming device of the left rear track assembly of FIG. 9.
Figure 14:
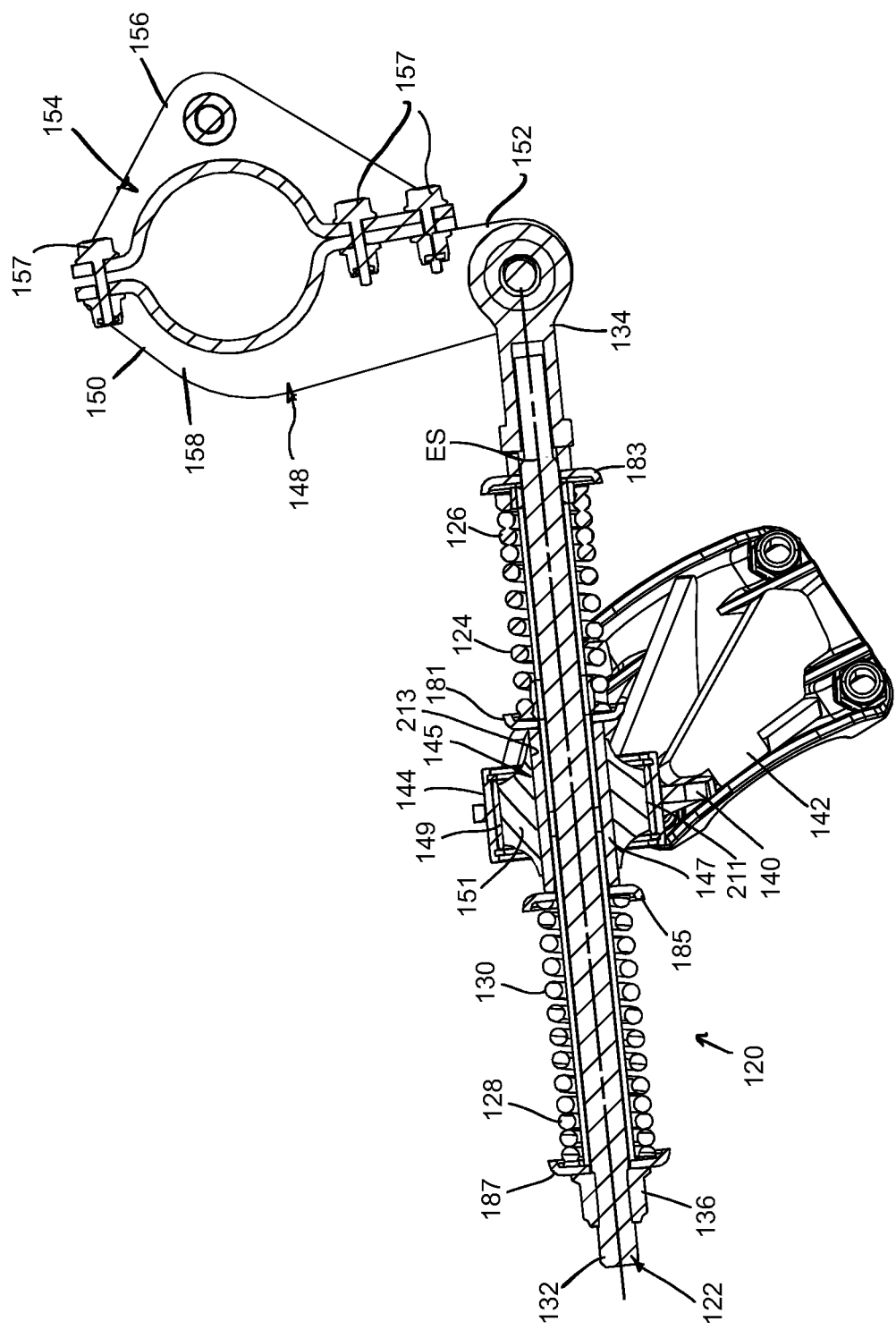
FIG. 14 is a cross-sectional view of the rotation limiting device of FIG. 13.

The rotation limiting device 120 has an elongate support 122 which supports front biasing members 124, 126 and rear biasing members 128, 130. The elongate support 122 includes a stabilizing rod 132 and front and rear stoppers 134, 136. As shown in FIG. 14, the stabilizing rod 132 defines a support axis ES of the elongate support 122. The front and rear biasing members 124, 126, 128, 130 are mounted to the stabilizing rod 132. In particular, in this embodiment, the biasing members 124, 126, 128, 130 are springs which are mounted over the stabilizing rod 132. The front and rear stoppers 134, 136 abut seats 183, 187 (FIG. 13) respectively. The seats 183, 187, which are generally annular and mounted to the stabilizing rod 132, in turn seat the biasing members 126, 130 respectively. The front and rear stoppers 134, 136 may be implemented in any suitable way. For instance, in this embodiment, the front stopper 134 is a rod end which defines a front end 123 of the elongate support 122, while the rear stopper 136 is a fastener (e.g., a nut) disposed proximate to a rear end 125 of the elongate support 122. As can be seen in FIG. 7, the elongate support 122 is disposed vertically lower than the drive wheel axis 87.

In order to connect the rotation limiting device 120 to the frame 80 of the track assembly 18, the track assembly 18 has a connection bracket 140 which has a frame connecting end 142 and a device connecting end 144. The frame connecting end 142 is connected to the upper portion of the frame 80 while the device connecting end 144 is connected to the rotation limiting device 120. More specifically, the device connecting end 144 is slidably mounted to the elongate support 122 such that the device connecting end 144 is slidably movable along a length of the elongate support 122. In particular, as shown in FIGS. 14 and 15A, the rotation limiting device 120 has a bushing assembly 145 that slidably connects the device connecting end 144 of the connection bracket 140 to the elongate support 122. Notably, the bushing assembly 145 is received within a cylindrical opening defined by the device connecting end 144 of the connection bracket 140.

Figure 15B:
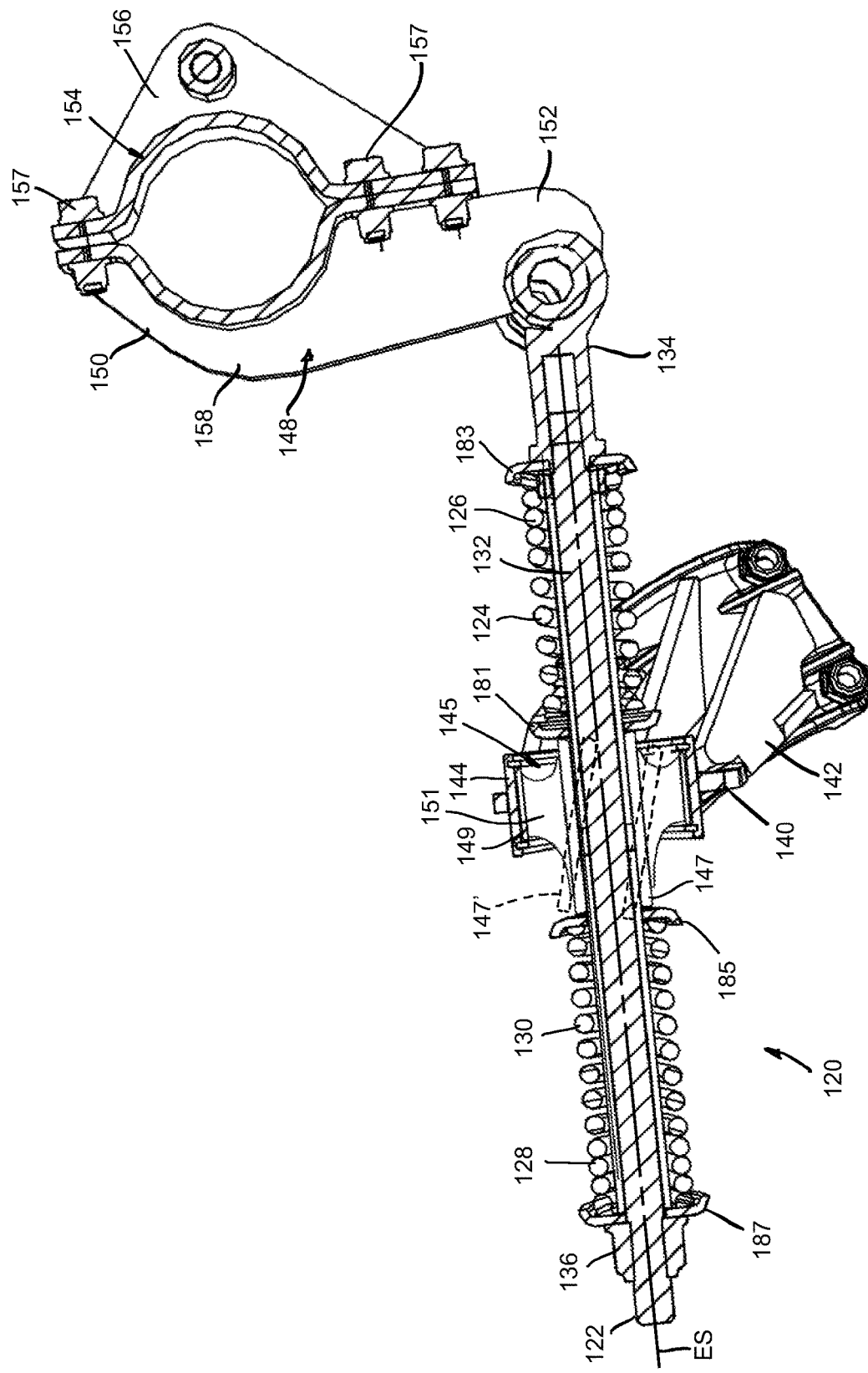
FIG. 15B is a cross-sectional view of the rotation limiting device of FIG. 13 in a state which the bushing assembly of the left rear track assembly is axially biased.
Figure 16:
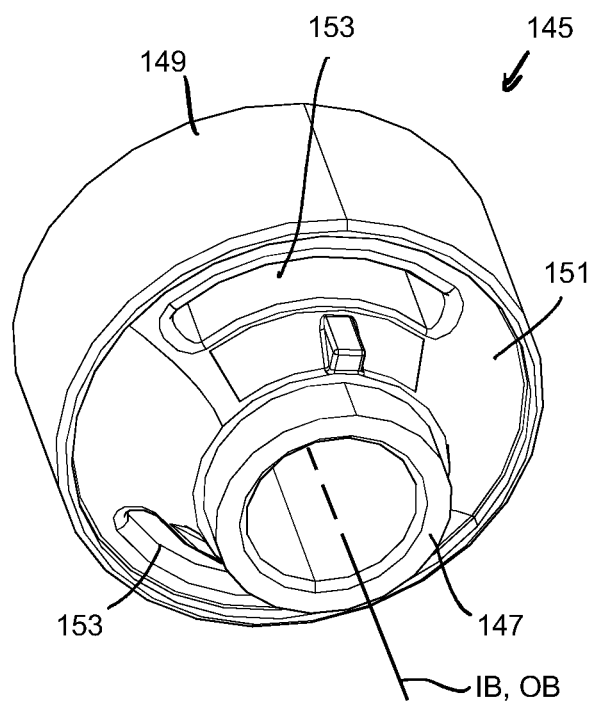
FIG. 16 is a perspective view, taken from a rear, left side, of the bushing assembly of FIG. 15A.
Figure 17:
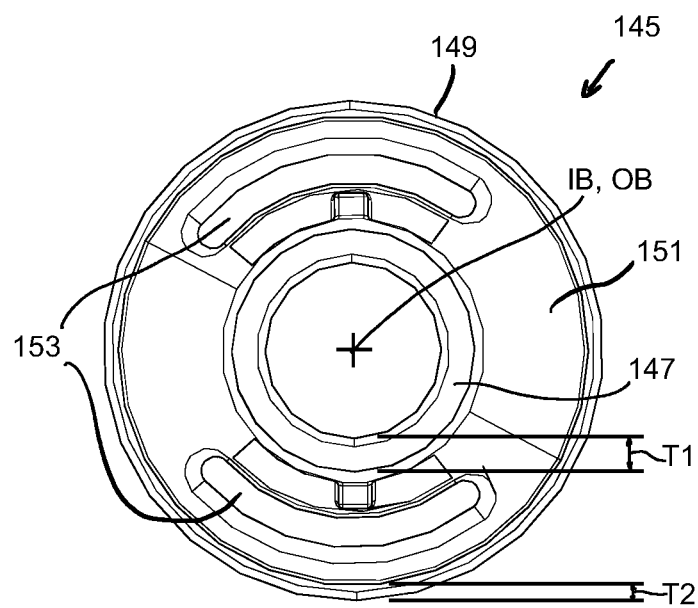
FIG. 17 is a rear elevation view of the bushing assembly of FIG. 15A.

As shown in FIGS. 14 to 17, the bushing assembly 145 includes an inner bushing 147, an outer bushing 149, and a resilient element 151 interconnecting the inner and outer bushings 147, 149. The outer bushing 149 is affixed to the device connecting end 144 (i.e., to an inner periphery the device connecting end 144 defining the cylindrical opening thereof) while the inner bushing 147 is slidably mounted to the stabilizing rod 132. The resilient element 151 is generally annular and has two openings 153 extending from a front side to a rear side of the resilient element 151. As shown in FIGS. 16 and 17, each opening 153 has a curved elongated shape having a radius centered about a central axis of the resilient element 151. The openings 153 are used to customize the resilient force of the resilient element 151. For instance, fewer or more openings 153 (or no openings 153 at all) could be provided to customize the linear and angular forces exerted by the resilient element 151. The resilient element 151 is connected between an outer peripheral surface of the inner bushing 147 and an inner peripheral surface of the outer bushing 149. In particular, the resilient element 151 is bonded to the inner and outer bushings 147, 149. In this embodiment, the resilient element 151 is made of rubber. It is contemplated that the resilient element 151 could be made of any other suitable resilient material in other embodiments.

With reference to FIG. 14, in this embodiment, the inner bushing 147 is dimensioned to be longer than the outer bushing 149 (i.e., along the axial direction). In addition, the inner bushing 147 is thicker than the outer bushing 149. In particular, as can be seen in FIG. 17, the inner bushing 147 has a thickness T1, measured radially, that is greater than a thickness T2 of the outer bushing 149.

The inner bushing 147 abuts, on either side thereof, seats 181, 185 which respectively seat the biasing members 124, 130. The seats 181, 185 are generally annular and mounted to the stabilizing rod 132. More specifically, the front biasing members 124, 126 are disposed forward of the bushing assembly 145 (and thus the device connecting end 144) while the rear biasing members 128, 130 are disposed rearward of the bushing assembly 145. Thus, as the inner bushing 147 moves along the length of the elongate support 122, either the front biasing members 124, 126 or the rear biasing members 128, 130 are compressed and resist rotation of the track assembly 18 about the drive wheel axis 87. Notably, with reference to FIG. 11, the front biasing members 124, 126 resist rotation of the track assembly 18 about the drive wheel axis 87 in a direction D1 while the rear biasing members 128, 130 resist rotation of the track assembly 18 about the drive wheel axis 87 in a direction D2.

Due to the resilience of the resilient element 151, when the track assembly 18 rotates about the drive wheel axis 87, the outer bushing 149 can move relative to the inner bushing 147 to a certain degree allowed by the resilient element 151, as shown in FIGS. 15A and 15B. This ensures that an inner bushing axis IB defined by the inner bushing 147 remains coaxial to the support axis ES of the elongate support 122 defined by the stabilizing rod 132. In some embodiments, it is contemplated that the inner bushing axis IB could be parallel to the support axis ES instead of being coaxial. As a result, as shown in FIGS. 15A and 15B, the spring seats 181, 185, which are abutted by the inner bushing 147, remain oriented such that a surface thereof abutting the biasing members 124, 130 is generally perpendicular to the support axis ES of the elongate support 122 throughout the rotation of the track assembly 18 about the drive wheel axis 87. As such, force is applied equally around the circumference of the ends of the biasing members 124, 130. In turn, the ends of the biasing members 124, 130, which are seated on the seats 181, 185, also remain oriented generally perpendicularly to the support axis ES of the elongate support 122. This can help reduce a bending moment applied on the biasing members 124, 130 which can be beneficial to avoid the biasing members 124, 130 from being pushed against the stabilizing rod 132, potentially impeding proper biasing (compression or expansion) of the biasing members 124, 130.

In addition, the resilience of the resilient element 151 can help reduce noise generated by the rotation limiting device 120 compared to conventional rotation limiting devices. Notably, the provision of the resilient element 151 allows reducing a spacing between the stabilizing rod 132 and the inner bushing 147 compared to conventional rotation limiting devices which are designed with a large spacing such that a rigid bushing can properly rotate relative to the stabilizing rod.

As will be explained in greater detail below, the resilient element 151 also resists the rotation of the track assembly 18 about the drive wheel axis 87 in either direction D1, D2.

The front biasing members 124, 126 have different biasing rates (i.e., spring rates) such that they are compressed at different rates. In particular, the distal front biasing member 126, which is closer to the front end 123 of the elongate support 122 than the proximal front biasing member 124, has a biasing rate that is greater than the biasing rate of the proximal front biasing member 124. As such, a greater amount of force is required to compress the distal front biasing member 126 than the proximal front biasing member 124. The smaller biasing rate of the proximal front biasing member 124 reduces slack (i.e., free play) in the rotation limiting device 120 such as to reduce noise and to prevent the track assembly 18 from rotating about the drive wheel axis 87 at the slightest irregularity encountered on the ground.

In a similar manner, the rear biasing members 128, 130 have different biasing rates. In particular, the distal rear biasing member 128, which is closer to the rear end 125 of the elongate support 122 than the proximal rear biasing member 130, has a biasing rate that is greater than the biasing rate of the proximal rear biasing member 130. As such, the rotation limiting device 120 has dual biasing rates in each rotation direction.

It is contemplated that the front biasing members 124, 126 could be replaced by a dual rate spring or one single rate spring and that, similarly, the rear biasing members 128, 130 could be replaced by a dual rate spring or one single rate spring.

As briefly mentioned above, the resilient element 151 also resists rotation of the track assembly 18 about the drive wheel axis 87 in either rotation direction D1, D2. Notably, the inner bushing 147 moves relative to the outer bushing 149 in accordance with a biasing rate of the resilient element 151. Thus, due to the resilience of the resilient element 151, the inner bushing 147 can move relative to the outer bushing 149 from an unbiased position (shown in FIG. 14), whereby the resilient element 151 is unbiased, to one of many possible biased positions (shown in FIGS. 15A, 15B), whereby the resilient element 151 is biased.

When the resilient element 151 is unbiased, as shown in FIGS. 14, 16 and 17 for example, the inner bushing 147 is generally coaxial with the outer bushing 149 such that the inner bushing axis IB defined by the inner bushing 147 is coincident with an outer bushing axis OB defined by the outer bushing 149 (see FIGS. 16, 17).

On the other hand, when the resilient element 151 is resiliently deformed as the track assembly 18 rotates about the drive wheel axis 87, the inner bushing 147 is rotatable relative to the outer bushing 149 such that the inner bushing axis IB can be angled relative to the outer bushing axis OB, as shown in FIG. 15A. In other words, the inner bushing 147 is rotatable relative to the outer bushing 149 such that, in the unbiased position of the inner bushing 147 (FIGS. 14, 16, 17), the inner and outer bushing axes IB, OB are coincident, and in a rotated position of the inner bushing 147 in which the inner bushing 147 has rotated relative to the outer bushing 149, the inner bushing axis IB is disposed at an angle relative to the outer bushing OB (FIG. 15A). It is to be understood that the direction in which the inner bushing axis IB is angled relative to the outer bushing axis OB depends on the rotation direction of the track assembly 18 about the drive wheel axis 87. Both in the unbiased and rotated positions of the inner bushing 147, the inner bushing axis IB remains generally coaxial to the support axis ES.

As shown in FIG. 15B, in addition to the inner bushing 147 being rotatable relative to the outer bushing 149, the resilient deformation of the resilient element 151 also allows the inner bushing 147 to move axially relative to the outer bushing 149 along the support axis ES. As such, the inner bushing 147 can move along the support axis ES relative to the outer bushing 149. The axial movement of the inner bushing 147 relative to the outer bushing 149 can be done either alone, as is generally shown in FIG. 15B, or in combination with a rotation relative to the outer bushing 149 described above such that the inner bushing 147 can be positioned such as depicted in dashed lines at 147' in FIG. 15B. This axial movement between the inner and outer bushings 147, 149 allows the resilient element 151 to act as another one of the springs 124, 126, 128, 130 as the resilient element 151 is "compressed" (i.e., biased) to resist rotation of the of the track assembly 18 about the drive wheel axis 87 in both rotation directions D1, D2.

Furthermore, the resilient element 151 can be sized and shaped to provide a desired biasing rate of the resilient element 151. For instance, in this embodiment, the biasing rate of the resilient element 151 is greater than the biasing rates of the front biasing members 124, 126 and the rear biasing members 128, 130. As such, during rotation of the track assembly 18, the front biasing members 124, 126 or the rear biasing members 128, 130 are compressed first before the resilient element 151 deforms resiliently once the front biasing members 124, 126 or the rear biasing members 128, 130 are coil bound (i.e., reached their maximum compression). In this embodiment, as can be seen in FIG. 14, the resilient element 151 is shaped such that a cross-section of its annular body is generally trapezoidal. Notably, an outer surface 211 of the resilient element 151 is shorter than the outer bushing 149 while an inner surface 213 of the resilient element 151 is longer than both the outer bushing 149 and the outer surface 211. As can be seen, the inner surface 213 of the resilient element 151 is shorter than the inner bushing 147.

It is contemplated that, in other embodiments, the biasing rate of the resilient element 151 could be less than the biasing rates of the front biasing members 124, 126 and the rear biasing members 128, 130.

As such, in addition to the biasing rates of the front biasing members 124, 126 and the biasing rates of the rear biasing members 128, 130, when the track assembly 18 rotates about the drive wheel axis 87, the biasing rate of the resilient element 151 also resists the rotation of the track assembly 18. Thus, in this embodiment, the rotation limiting device 120 has at least two (in embodiments in which the front biasing members 124, 126 as well as the rear biasing members 128, 130 are replaced by respective single rate springs) or three biasing rates in each rotation direction D1, D2. In particular, due to the additional biasing rate provided by the resilient element 151, one of the front biasing members 124, 126 and one of the rear biasing members 128, 130 may be omitted.

Figure 18:
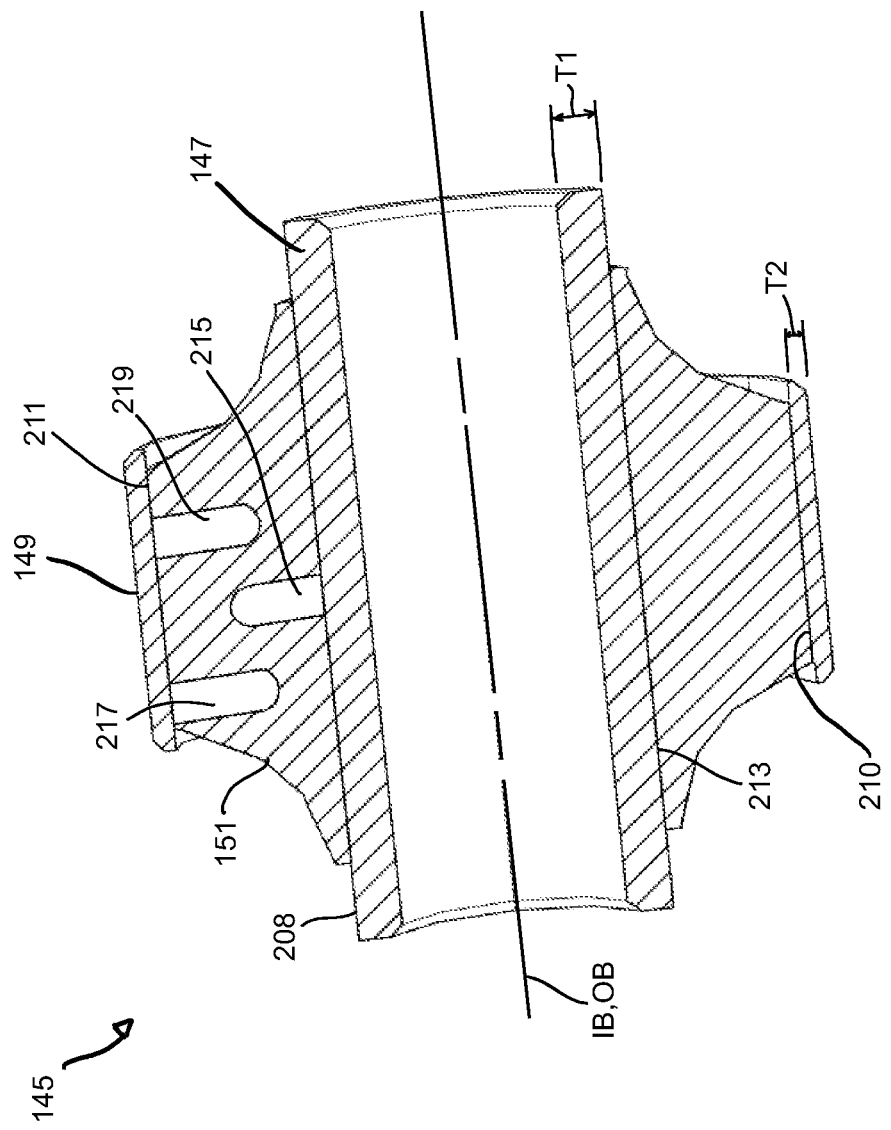
FIG. 18 is a cross-sectional view of an alternative embodiment of the bushing assembly of FIG. 15A.

FIG. 18 shows another embodiment of the bushing assembly 145 where like components have been identified with like reference numerals. In this embodiment, the inner and outer bushings 147, 149 comprise respective stoppers to limit movement therebetween when the resilient element 151 deforms resiliently in response to rotation of the track assembly 18 about the drive wheel axis 87. More specifically, as shown in FIG. 18, the inner bushing 147 has a stopper 215 extending radially from an outer surface 208 of the inner bushing 147 toward the outer bushing 149, while the outer bushing 149 has two stoppers 217, 219 extending radially from an inner surface 210 of the outer bushing 149 toward the inner bushing 147. The stopper 215 of the inner bushing 215 is disposed axially between the stoppers 217, 219 of the outer bushing 149. It is contemplated that the stoppers 215, 217, 219 could be reversed such that the inner bushing 147 comprises two stoppers and the outer bushing 149 comprises a single stopper disposed axially between the two stoppers of the inner bushing 147.

In this embodiment, the stoppers 215, 217, 219 are pin-like projections which protrude from the outer surface 208 of the inner bushing 147 and the inner surface 210 of the outer bushing 149 at a given circumferential position of the inner and outer bushings 147, 149. The stopper 215 of the inner bushing 147 is thus partly circumferentially and radially aligned with the stoppers 217, 219 of the outer bushing 149. As such, movement of the inner bushing 147 relative to the outer bushing 149 is limited as the stopper 215 approaches either one of the stoppers 217, 219 (depending on the direction in which the resilient element 151 is biased) as the material of the resilient element 151 is compressed between the stopper 215 and the stopper 217 or between the stopper 215 and the stopper 219.

It is contemplated that only two stoppers may be provided instead of three. For example, the outer bushing 149 could be provided with a single one of the stoppers 217, 219. In such an embodiment, movement of the inner bushing 147 relative to the outer bushing 149 would be limited as the stoppers approach one another in response to rotation of the track assembly 18 in one of the rotation directions D1, D2 but not the other.

It is also contemplated that the stoppers 215, 217, 219 could be annular in other embodiments, extending along the entire circumference of the inner and outer bushings 147, 149.

Figure 11:
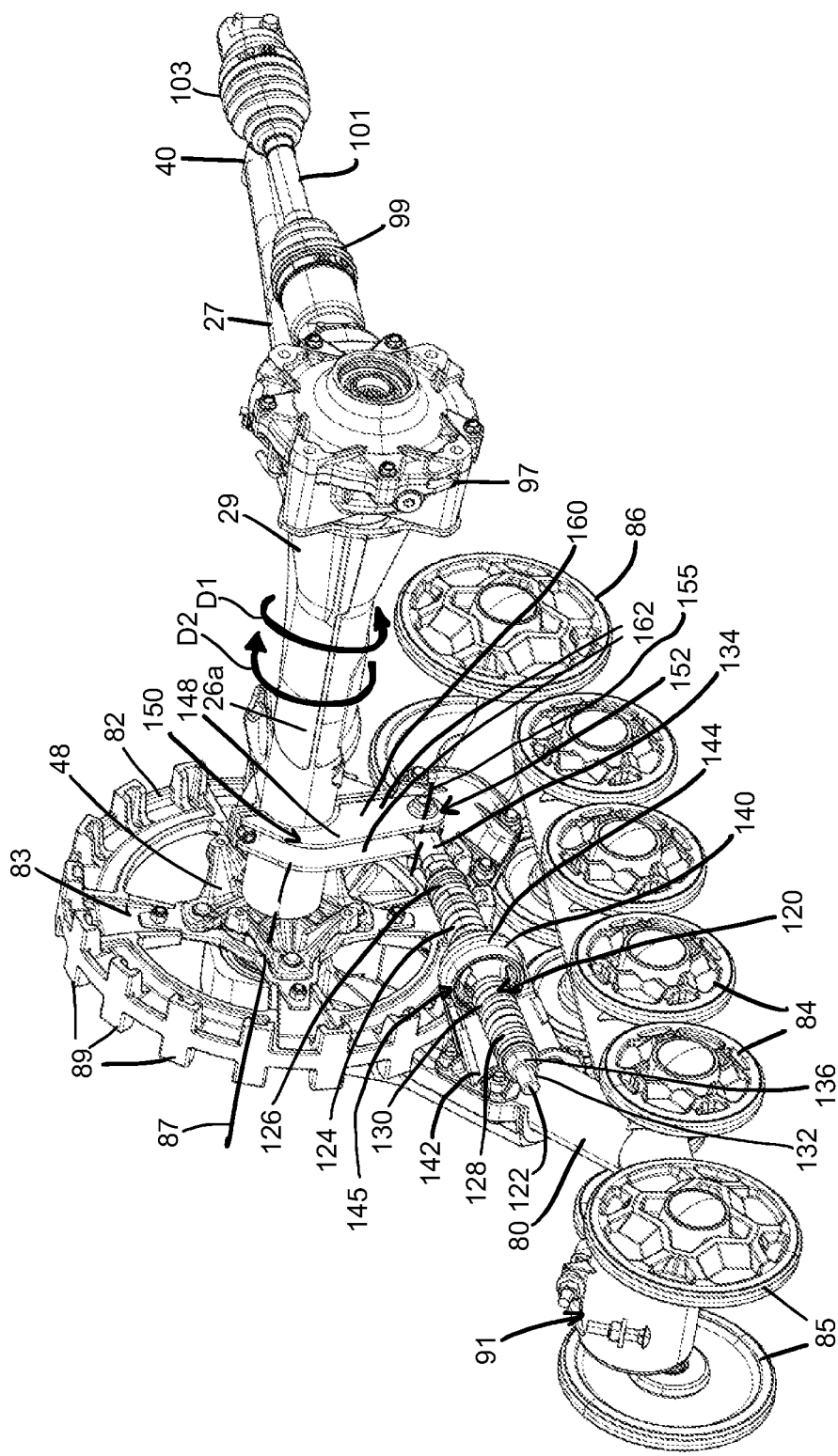
FIG. 11 is a perspective view, taken from a rear right side, of the components of FIG. 9.

The rotation limiting device 120 also has a suspension arm attachment 148 connecting the rotation limiting device 120 to the suspension arm 26a. The suspension arm attachment 148 is disposed forward of the connection bracket 140. As shown in FIGS. 9 to 11, the suspension arm attachment 148 has an upper portion 150 and a lower portion 152 vertically lower than the upper portion 150. The lower portion 152 is disposed vertically lower than the suspension arm 26a and, as discussed above, laterally between the inner and outer lateral edges 94, 96 of the track 88. Moreover, as shown in FIG. 11, the lower portion 152 is pivotally connected to the front end 123 of the elongate support 122 while the upper portion 150 is connected to the laterally-extending portion 29 of the suspension arm 26a.

Figure 12:
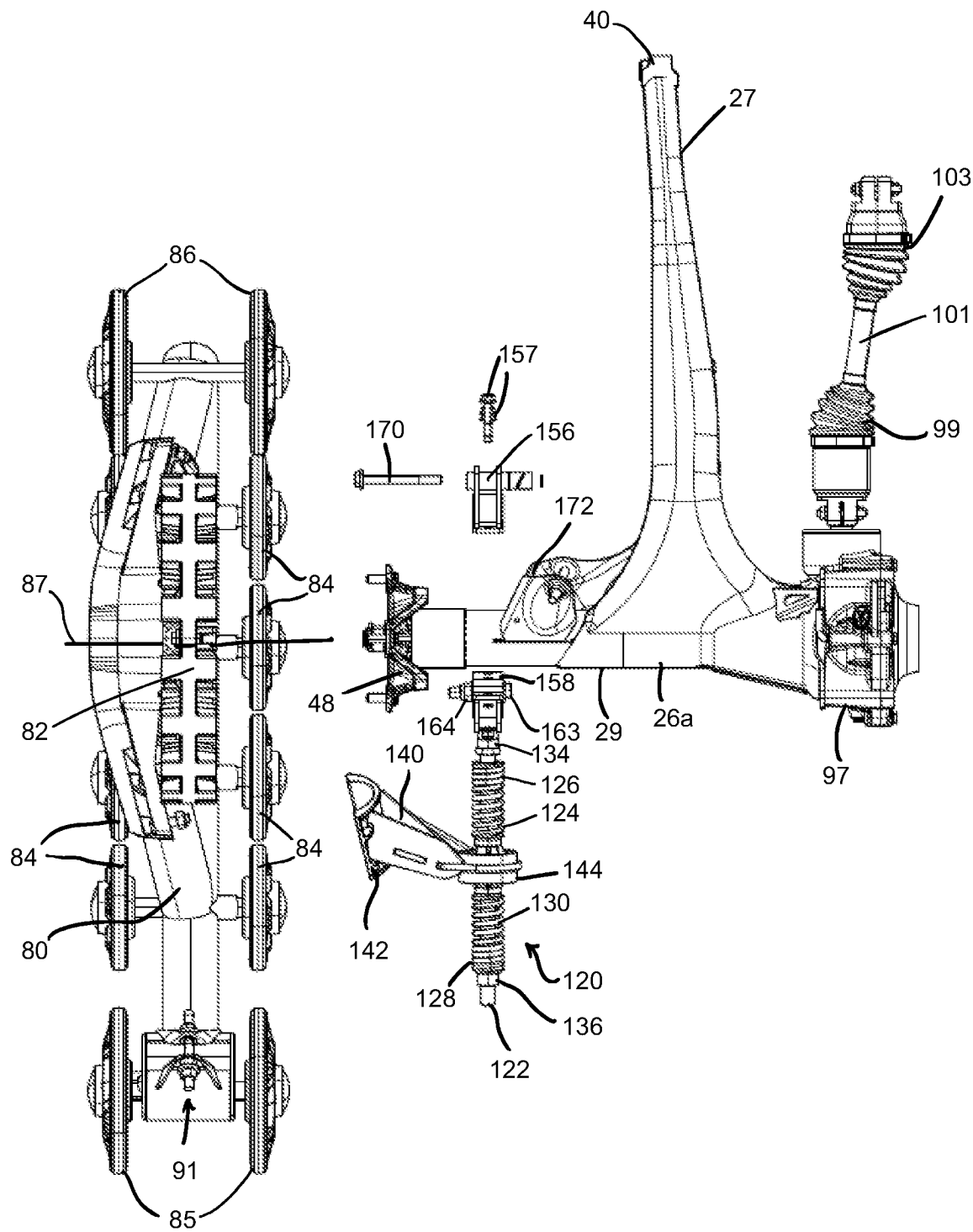
FIG. 12 is a partially exploded top plan view of the components of FIG. 9.

More particularly, in this embodiment, the upper portion 150 of the suspension arm attachment 148 includes a clamp 154 (FIG. 10) for connecting the upper portion 150 to the laterally-extending portion 29 of the suspension arm 26a. When connected to the suspension arm 26a, the clamp 154 surrounds a portion of the laterally-extending portion 29 of the suspension arm 26a. As shown in FIG. 12, the clamp 154 includes two halves 156, 158 which are connected to one another by fasteners 157 (FIGS. 9, 10, 13) to retain the clamp 154 onto the suspension arm 26a. More specifically, as shown in FIG. 13, when the two halves 156, 158 are secured to one another, a gap separates the two halves 156, 158 at an upper end of the clamp 154 such that, by means of the fasteners 157, the two halves 156, 158 apply a force and thus clamp down on the suspension arm 26a which prevents the suspension arm attachment 148 from rotating about the suspension arm 26a.

Furthermore, in this embodiment, as shown in FIG. 11, the lower portion 152 of the suspension arm attachment 148 includes a connecting arm 160 having two prongs 162 extending parallel to one another. The rod end 134 of the elongate support 122 is disposed between the two members 162 and a fastener 163 (e.g., a bolt) extends through the prongs 162 of the connecting arm 160 and the rod end 134 to pivotally connect the rod end 134 to the elongate support 122 about a pivot connection axis 135 (FIG. 9) extending parallel to the drive wheel axis 87. As such, the elongate support 122, the front and rear biasing members 124, 126, 128, 130, and the front and rear stoppers 134, 136 are pivotally connected to the suspension arm 26a via the suspension arm attachment 148. The pivot connection axis 135 is disposed vertically lower than the drive wheel axis 87 everywhere between the inner lateral edge 94 of the track 88 and a laterally innermost portion of the drive wheel 82. Another fastener 164 (e.g., a nut) securely receives the fastener 163 to retain the rod end 134 to the connecting arm 160.

The suspension arm attachment 148 locks the rotation limiting device 120 to the suspension arm 26a in order to prevent the suspension arm attachment 148 from rotating relative to the suspension arm 26a in case the force applied by the clamp 154 on the suspension arm 26a is not sufficient to keep the suspension arm attachment 148 from rotating about the suspension arm 26a. To that end, with reference to FIGS. 9, 10 and 12, the track assembly 18 has a fastener 170 that extends laterally and engages the upper portion 150 of the suspension arm attachment 148 and a bracket 172 of the suspension arm 26a. In particular, in this embodiment, the bracket 172 is welded to the laterally-extending portion 29 of the suspension arm 26a and has two generally parallel walls 174 (FIG. 10) to which the lower end 33 of the shock absorber 26b is connected and a generally vertical wall 176 for connecting the suspension arm attachment 148 thereto. The fastener 170 extends through the vertical wall 176 of the bracket 172 and through the upper portion 150 of the suspension arm attachment 148 to prevent rotation of the suspension arm attachment 148 relative to the suspension arm 26a. It is contemplated that the bracket 172 could be integrally formed with the suspension arm 26a. It is also contemplated that in an alternative embodiment, the bracket 172 connects to the suspension arm attachment 148 with the fastener 170, but is not connected to the lower end 33 of the shock absorber 26b.

Figure 19:
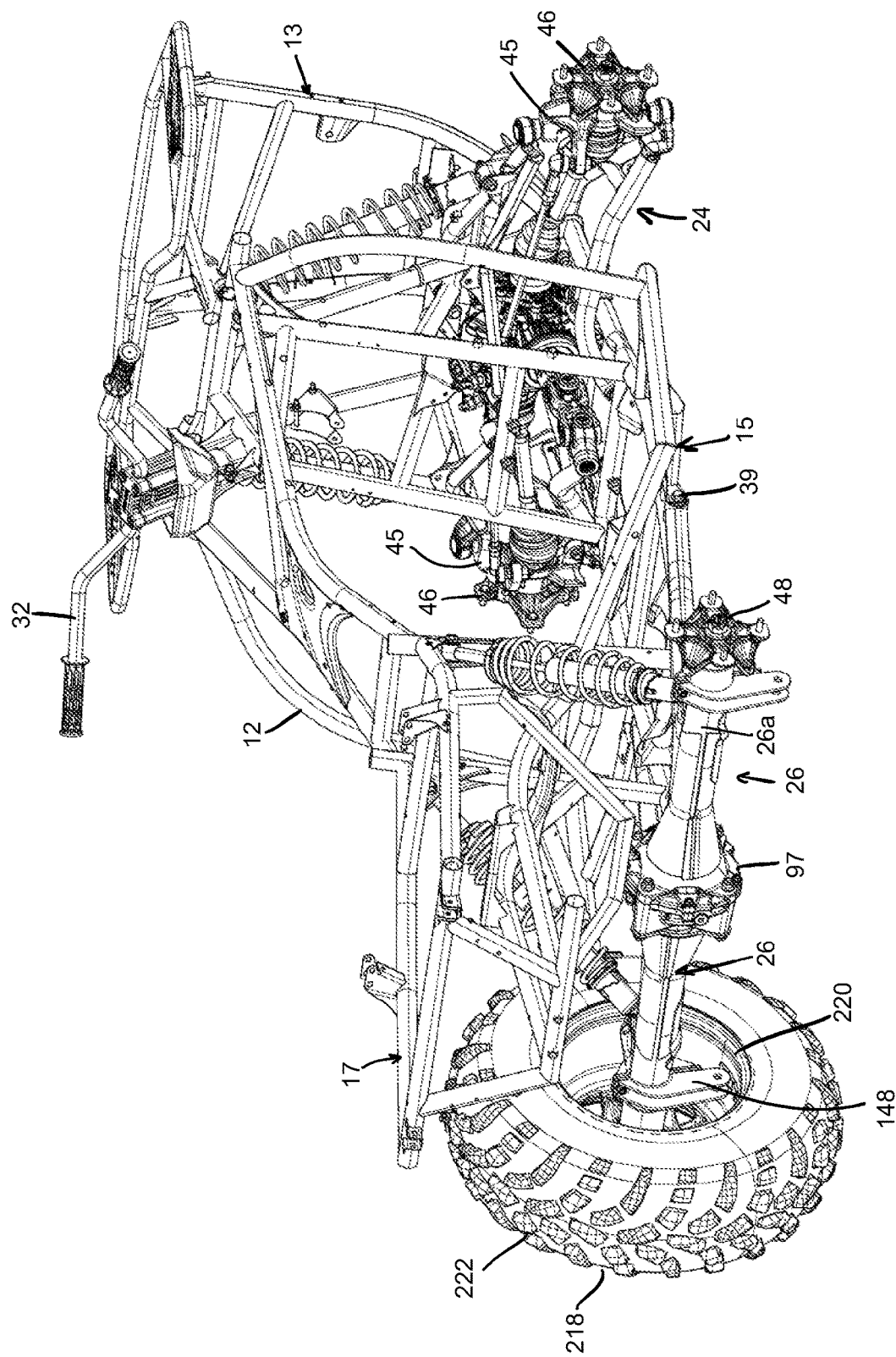
FIG. 19 is a perspective view, taken from a rear right side, of the frame, the suspension assemblies and certain steering components of the vehicle of FIG. 1, with a left ground-engaging wheel mounted to the left rear suspension assembly instead of the left rear track assembly.
Figure 20:
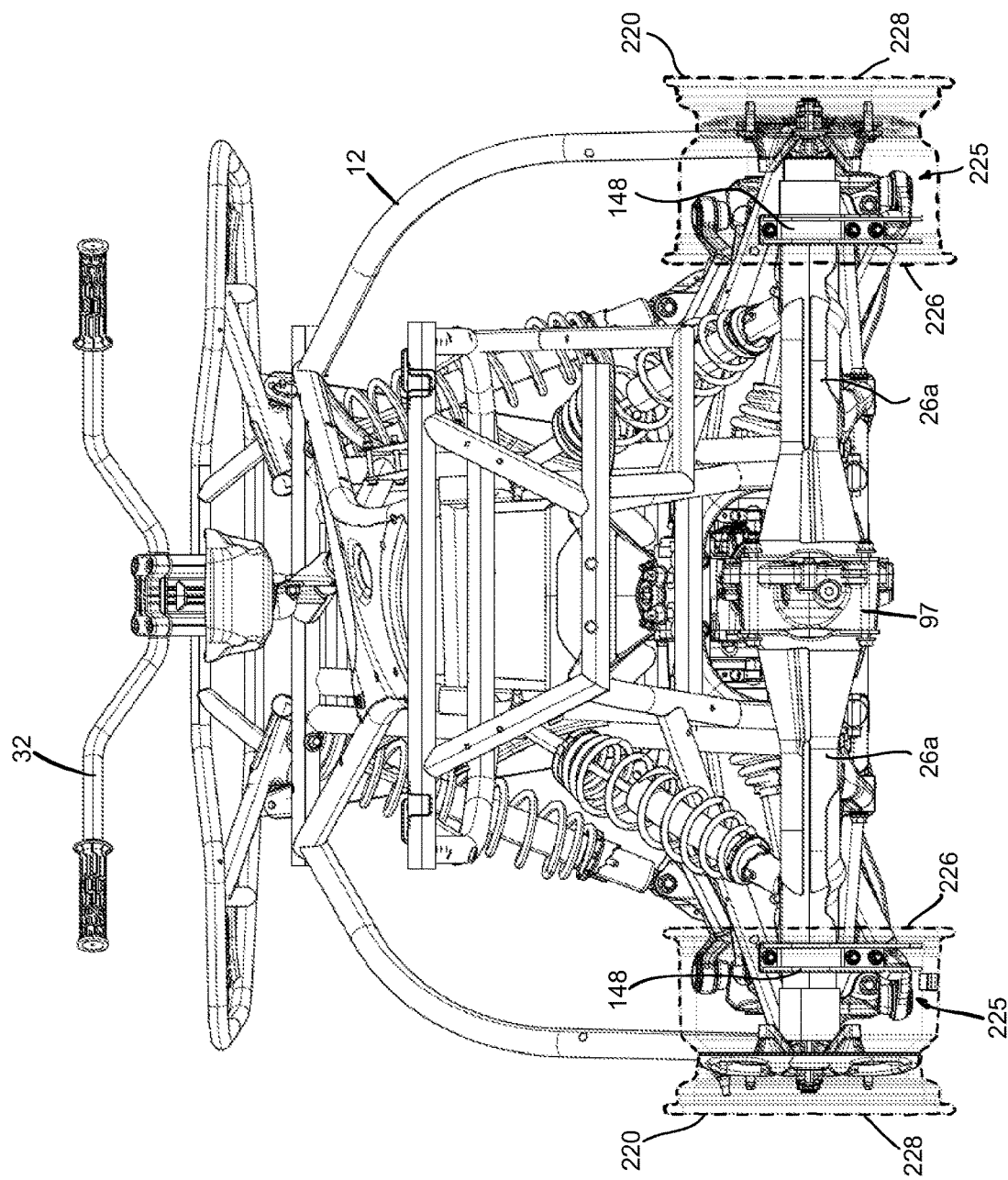
FIG. 20 is a rear elevation view of the frame, the suspension assemblies and certain steering components of the vehicle of FIG. 1, with rims of the rear ground-engaging

As shown in FIGS. 19 and 20, in this embodiment, the suspension arm attachment 148 remains attached to the suspension arm 26a when the track assembly 18 is uninstalled from the ATV 10. That is, the suspension arm attachment 148 is not disconnected from the suspension arm 26a when the track assembly 18 is removed from the ATV 10. Rather, when removing the track assembly 18 from the ATV 10, for example to install a corresponding one of the ground-engaging wheels 218 in its place, the elongate support 122 is disconnected from the connecting arm 160 of the lower portion 152 of the suspension arm attachment 148 (i.e., the rod end 134 is disconnected from the connecting arm 160) and the suspension arm attachment 148 remains connected to the suspension arm 26a (via the clamp 154 and the fastener 170). This facilitates the installation/removal of the track assembly 18 onto/from the ATV 10.

Furthermore, despite the suspension arm attachment 148 remaining connected to the suspension 26a, the suspension arm attachment 148 does not perturb the installation of the ground-engaging wheel 218. Indeed, as shown in FIGS. 19 and 20, when the ground-engaging wheel 218 is installed on the ATV 10 to replace the track assembly 18, a rim 220 of the ground-engaging wheel 218, to which a tire 222 is mounted, surrounds the suspension arm attachment 148. More specifically, the rim 220 defines a partially enclosed space 225, disposed laterally between inner and outer lateral edges 226, 228 of the rim 220 (more particularly between the inner lateral edge 226 and hub of the rim 220), within which the suspension arm attachment 148 is contained.

It is contemplated that, in alternative embodiments, the suspension arm attachment 148 could be detached from the suspension arm 26a when the track assembly 18 is uninstalled from the ATV 10.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A track assembly for a vehicle, comprising:
a frame;
a plurality of track-contacting wheels, including:
   a drive wheel rotationally connected to the frame, the drive wheel defining a drive wheel axis about which the drive wheel is rotatable; and
   at least one idler wheel rotationally connected to the frame;
an endless track disposed around the plurality of track-contacting wheels, the drive wheel being adapted for driving the endless track;
a rotation limiting device for limiting rotation of the track assembly relative to a frame of the vehicle about the drive wheel axis, the rotation limiting device being connectable between the frame of the track assembly and the vehicle, the rotation limiting device comprising:
   an elongate support extending along a support axis and having a first end and a second end;
   a first biasing member mounted to the elongate support; and
   a second biasing member mounted to the elongate support;
a connection bracket for connecting the rotation limiting device to the frame of the track assembly, the connection bracket having a frame connecting end connected to the frame of the track assembly and a device connecting end connected to the rotation limiting device, the device connecting end being slidably mounted to the elongate support of the rotation limiting device such that:
   the first biasing member is disposed between the device connecting end and the first end of the elongate support, the first biasing member being compressed between the device connecting end and the first end of the elongate support when the track assembly rotates in a first rotation direction about the drive wheel axis, and
   the second biasing member is disposed between the device connecting end and the second end of the elongate support, the second biasing member being compressed between the device connecting end and the second end of the elongate support when the track assembly rotates in a second rotation direction about the drive wheel axis, and
a bushing assembly slidably connecting the device connecting end of the connection bracket to the elongate support, the bushing assembly comprising:
   an inner bushing slidably mounted to the elongate support, the inner bushing defining an inner bushing axis;
   an outer bushing affixed to the device connecting end of the connection bracket, the outer bushing defining an outer bushing axis; and
   a resilient element connected between the inner and outer bushings, the resilient element being resiliently deformable such that:
      the inner bushing is rotatable relative to the outer bushing such that the inner bushing axis can be angled relative to the outer bushing axis with the inner bushing axis remaining one of:
         generally parallel to the support axis of the elongate support, and
         generally coaxial to the support axis of the elongate support; and
      the inner bushing is axially movable relative to the outer bushing along the support axis of the elongate support.

2. The track assembly of claim 1, wherein at least one of the first and second biasing members is a spring.

3. The track assembly of claim 2, wherein:
the rotation limiting device further comprises at least one spring seat supporting the at least one of the first and second biasing members;
the at least one spring seat is disposed between the inner bushing and the at least one of the first and second biasing members; and
the at least one spring seat remains oriented generally perpendicular to the support axis of the elongate support.

4. The track assembly of claim 2, wherein the at least one of the first and second biasing members is a dual rate spring.

5. The track assembly of claim 1, wherein the first and second biasing members are springs.

6. The track assembly of claim 1, wherein the resilient element is made of rubber.

7. The track assembly of claim 1, wherein the resilient element defines at least one opening offset from the outer bushing axis, the at least one opening extending axially from a first end to a second end of the resilient element.

8. The track assembly of claim 7, wherein the at least one opening has a curved elongated shape.

9. The track assembly of claim 1, wherein:
the inner bushing comprises a first stopper extending radially toward the outer bushing;
the outer bushing comprises a second stopper extending radially toward the inner bushing; and
the first and second stoppers are at least partly circumferentially and radially aligned with one another such that movement of the inner bushing relative to the outer bushing is limited as the first and second stoppers approach one another.

10. The track assembly of claim 9, wherein:
one of the inner bushing and the outer bushing comprises a third stopper extending radially;
the third stopper is at least partly circumferentially and radially aligned with the first and second stoppers;
when the outer bushing comprises the third stopper, the first stopper is disposed axially between the third stopper and the second stopper, movement of the inner bushing relative to the outer bushing being limited when the first stopper approaches the second stopper or the third stopper;
when the inner bushing comprises the third stopper, the second stopper is disposed axially between the third stopper and the first stopper, movement of the inner bushing relative to the outer bushing being limited when the second stopper approaches the first stopper or the third stopper.

11. The track assembly of claim 1, wherein:
the first biasing member has a first biasing rate;
the second biasing member has a second biasing rate; and
the resilient element has a third biasing rate that is greater than the first and second biasing rates.

12. The track assembly of claim 1, wherein:
the first biasing member has a first biasing rate;
the second biasing member has a second biasing rate; and the resilient element has a third biasing rate that is less than the first and second biasing rates.

13. The track assembly of claim 1, wherein the inner bushing is longer than the outer bushing.

14. The track assembly of claim 1, wherein the inner bushing is thicker than the outer bushing.

15. The track assembly of claim 1, wherein an outer surface of the resilient element is shorter than the outer bushing.

16. The track assembly of claim 1, wherein an inner surface of the resilient element is shorter than the inner bushing.

17. The track assembly of claim 16, wherein the inner surface of the resilient element is longer than the outer bushing.

18. The track assembly of claim 1, wherein the resilient element is annular and has a generally trapezoidal cross-section.

19. A vehicle comprising:
- a vehicle frame;
- a motor supported by the vehicle frame;
- a suspension assembly connected to the vehicle frame; and
- the track assembly of claim 1 connected to the suspension assembly.

\* \* \* \* \*